MAGNETIC CORE SCANNING ARRANGEMENT FOR ELECTRONIC TELEPHONE SWITCHING SYSTEM

Filed Jan. 9, 1963

INVENTORS A. M. GUERCIO
H. F. MAY

BY Howard R Popper
ATTORNEY

May 31, 1966 A. M. GUERCIO ETAL 3,254,157

MAGNETIC CORE SCANNING ARRANGEMENT FOR ELECTRONIC TELEPHONE SWITCHING SYSTEM

Filed Jan. 9, 1963 24 Sheets-Sheet 3

May 31, 1966 A. M. GUERCIO ETAL 3,254,157

MAGNETIC CORE SCANNING ARRANGEMENT FOR ELECTRONIC TELEPHONE SWITCHING SYSTEM

Filed Jan. 9, 1963 24 Sheets-Sheet 4

May 31, 1966 A. M. GUERCIO ETAL 3,254,157

MAGNETIC CORE SCANNING ARRANGEMENT FOR ELECTRONIC TELEPHONE SWITCHING SYSTEM

Filed Jan. 9, 1963 24 Sheets-Sheet 11

May 31, 1966 A. M. GUERCIO ETAL 3,254,157

MAGNETIC CORE SCANNING ARRANGEMENT FOR ELECTRONIC TELEPHONE SWITCHING SYSTEM

Filed Jan. 9, 1963 24 Sheets-Sheet 15

May 31, 1966 A. M. GUERCIO ETAL 3,254,157

MAGNETIC CORE SCANNING ARRANGEMENT FOR ELECTRONIC TELEPHONE SWITCHING SYSTEM

Filed Jan. 9, 1963 24 Sheets-Sheet 17

May 31, 1966 A. M. GUERCIO ETAL 3,254,157

MAGNETIC CORE SCANNING ARRANGEMENT FOR ELECTRONIC TELEPHONE SWITCHING SYSTEM

Filed Jan. 9, 1963 24 Sheets-Sheet 20

3,254,157

MAGNETIC CORE SCANNING ARRANGEMENT FOR ELECTRONIC TELEPHONE SWITCHING SYSTEM

Anthony M. Guercio, Belford, and Harold F. May, Holmdel, N.J., assignors to Bell Telephone Laboratories, Incorporated, New York, N.Y., a corporation of New York Filed Jan. 9, 1963, Ser. No. 250,416
15 Claims. (Cl. 179—18)

This invention relates to electronic monitoring and control equipment and more particularly to apparatus for scanning telephone circuits in high-speed telephone switching systems.

In telephone systems, numerous circuits from time to time exhibit changing conditions either as a result of a direct action taken by a telephone customer or as a result of common control operations. Although the condition of each individual circuit may change fairly slowly, when it is desired to monitor a great number of these circuits, the monitoring apparatus must be capable of very rapid operation so that an inordinate time is not consumed in ascertaining the condition of each circuit. This rapid monitoring of a plurality of circuits is called "scanning."

When a telephone customer removes the handset of his telephone and releases the switchhook, the line current rises from some minimum or leakage value to an operating current or "off-hook" value. Because of circuit inductance, the change in line current condition is fairly slow, taking perhaps a few milliseconds. The change in line current from its on-hook to its off-hook value (and vice versa) may conveniently be sensed by the type of surveillance device disclosed in the copending application of J. A. Baldwin and H. F. May, Serial No. 26,758, filed May 4, 1960, now Patent 3,175,042 issued March 23, 1965.

When a large number of telephone circuits are to be monitored, it is convenient to arrange the monitoring devices in an array and to provide an access switching circuit for rapidly applying sequential interrogating pulses to them. However, in a practical electronic telephone switching system the implementation of this approach must be achieved in such a manner that certain cardinal principles which underline the overall system will not be sacrificed. Because telephone switching systems execute a common carrier function affecting the public interest, advances in component technology, however, attractive they may seem from the standpoint of economy, space saving or rapidity of operation, must be tempered by the assurance that their incorporation into an operating telephone plant will meet the standard of reliability with which telephone service has been traditionally imbued.

In a telephone switching system to which the principles of the present invention advantageously may be applied, economy and rapidity of operation may be facilitated through the use of high-speed electronic common control equipment. Control orders generated at central control locations may then be executed by peripheral units of equipment. Accuracy and reliability of operation may be enhanced by requiring the peripheral units to verify to common control the fact that they have received control orders and by providing alternative or duplicate paths for transmitting both the control orders and the responses or "answers" thereto. In addition to these normally occurring checks and balances of system operation, commands may from time to time be dispatched from central control locations to initiate test exercises to elicit predetermined responses from designated units. In the contemplated electronic switching system, normal as well as test commands are dispatched from central control locations to the peripheral units over a peripheral bus arrangement which includes two duplicated transmission systems, called the "0" and the "1" communications bus for peripheral units, either of which may be utilized to transmit information to and from the peripheral units and central control. The scanner arrangement, which is the subject of the present invention, is a circuit which carries into execution the objectives of overall system reliability and short-holding-time of central control and which enables its associated peripheral units to perform their long-holding-time functions by providing verifiable supervisory control thereover.

In accordance with the principles of the present invention, each scanner includes a plurality of "ferrod" monitoring devices each of which is associaed with a circuit under surveillance. The term "ferrod" has been coined to denote the type of monitoring device which comprises the apertured stick of ferromagnetic material with its control windings and interrogate and readout conductors disclosed in the above-mentioned Baldwin-May application. Briefly, the ferrod exhibits the desirable characteristics that sharp, well-defined pulses may be induced by transformer action from the interrogate to the readout conductor so long as the monitored current in the control winding remains below the range of anticipated operating (for example, off-hook) currents. When the monitored current rises to the level of anticipated operating currents transformer action is inhibited. Because the control windings are wound coaxially with the stick while the interrogate and readout conductors thread apertures of the stick, the closed, circumferential flux paths about the apertures and the open, longitudinal flux path between the poles of the stick prevent interrogate pulses from injecting noise into the monitored circuit. Nevertheless, the material of which the stick is fabricated exhibits remanent flux switching characteristics about the apertures so that (as long as the control windings do not longitudinally saturate the stick) bipolar pulses applied to the interrogate conductor will switch and re-switch the circumferential flux and induce well-defined bipolar pulses in the readout conductor. The demagnetizing attributes of the longitudinal flux path and the "square-loop" switching characteristics of the apertures provide a monitoring device eminently suitable to be used in large scanning arrays which require that only a minimal time be spent in classifying the condition of each of the plurality of different operating level circuits under surveillance.

In the above referred-to electronic switching system, the condition of the lines, trunks, junctor circuit (intra-office trunks) and of the various circuits associated with their respective switching frames is monitored by a different scanner of the general type herein described. Unless otherwise noted, the scanner that will be discussed in detail is the line scanner but reference to the features of the other types of scanners will be made whenever appropriate. Each scanner has inputs from the "0" and the "1" communications buses for peripheral units. (The peripheral communications buses are balanced transmission lines capable of transmitting fractional microsecond pulse signals but differ from conventional "transmission" lines in that peripheral units are but lightly coupled to the bus.) The "0" and "1" communications buses enter each of the two access circuits of the scanner for operating at any time either of the two "controllers" for the scanner in accordance with the address information transmitted over the buses.

Included in each scanner controller is a coincident current magnetic core matrix which responds to the address information furnished its respective access circuit to interrogate the ferrod monitoring devices. The ferrod devices are interrogated, a row at a time, by the selected core matrix applying a bipolar pulse to an interrogate loop comprising the serially-connected, aperture-threading interrogate conductors of each ferrod. Each ferrod monitoring an idle line will be longitudinally unsaturated and will transformer couple the bipolar pulse into a readout conductor threading its aperture as the remanent flux in the aperture is switched. Ferrods monitoring busy lines, on the other hand, will be longitudinally saturated and will induce no pulses in their readout conductors. Readout conductors are connected together in columns to output circuits for returning status information as to sixteen monitored lines at once over both a "0" and a "1" scanner answer bus.

The magnetic core matrix of the nonaddressed controller is in the standby condition and although its output windings are connected with those of the addressed controller, they are maintained in such an impedance state as not to impair or attenuate the interrogate pulse output and operation of the selected controller. Accordingly, the designation by central control of which controller is to be the addressed one and which the standby one may be arbitrary and may be changed from time to time during the system operation without restriction.

Further in accordance with the principles of the present invention, the interrogate loop for each row of ferrods is transformer coupled to an output gate to provide a signal on an answer lead of each of the scanner answer buses. This indicates to central control that a row of ferrods has uniquely been interrogated. The absence of signals on either answer bus enables the central control to either re-address the priorly addressed controller or to address the standby controller as determined by the central control program sequence.

During maintenance testing the receipt of a single address order suffices to provide outputs on the sixteen readout loops at once regardless of the state of the lines otherwise capable of being monitored by the ferrod array, and independently of either of the access matrices which under normally circumstances are required to interrogate the array. During maintenance testing the sixteen simultaneous outputs supplant the output (obtained during normal operation) which indicates the unique interrogation of a row of ferrods.

Accordingly, a feature of the present invention is an electronic scanner having two controllers for receiving the address of a desired group of supervisory devices which address may be provided to either controller from either of two peripheral communications buses.

Another feature of the present invention is an array of ferrod supervisory devices which array may be interrogated to categorically determine the status of a group of supervised circuits whose individual operating conditions lie anywhere within a predetermined range of values.

Another feature of the present invention is a scanner having an array of ferrod supervisory devices whose interrogating conductors are provided with bipolar pulses from either of two controllers having core matrix output windings in series with the ferrod interrogating conductors.

A further feature of the present invention is a scanner having an array of ferrod supervisory devices whose interrogating conductors may be provided with bipolar pulses from either of two controllers without changing the path of the interrogating current.

It is yet another feature of the present invention that that bipolar interrogate pulse provided to the ferrod array from an addressed controller not be attenuated by the nonaddressed controller.

A still further feature of the present invention is a circuit which respectively biases the core matrix of the addressed controller to provide one of the bipolar interrogating pulses and which biases the core matrix output winding of the nonaddressed controller to the low impedance condition.

Another feature of the present invention is a bias monitoring arrangement which permits a controller having a defective core matrix bias to re-arrange its coincident current selection windings into an emergency bias chain so that its output windings will not attenuate bipolar pulses provided by the operable controller when it is addressed.

A general feature of the present invention relates to a scanning circuit which provides an indication that the status information obtained on any interrogation of the scanning array pertains only to the status of a discrete plurality of the units capable of being monitored. It is an aspect of this feature that, though a plurality of units be monitored on each interrogation of the scanning array, the status information obtained be for the desired plurality and not for any indiscriminate plurality of the units capable of being monitored.

Another general feature of the present invention relates to the means for simultaneously providing maintenance test output signals to each of the scanner answer buses in response to a single address order independently of the state of any of the lines capable of being monitored by the array and independently of the normal circuitry for interrogating the array.

The foregoing and other objects and features may be more readily understood by referring now to the drawing in which:

FIGS. 1A and 1B taken together show a schematic block diagram of the apparatus of the present invention;

FIGS. 1C and 1D show the equivalency between the pictorial and schematic representation of the ferrod monitoring device;

FIGS. 2, 3, and 6 show the equipment of the ferrod matrix;

Figure 13:
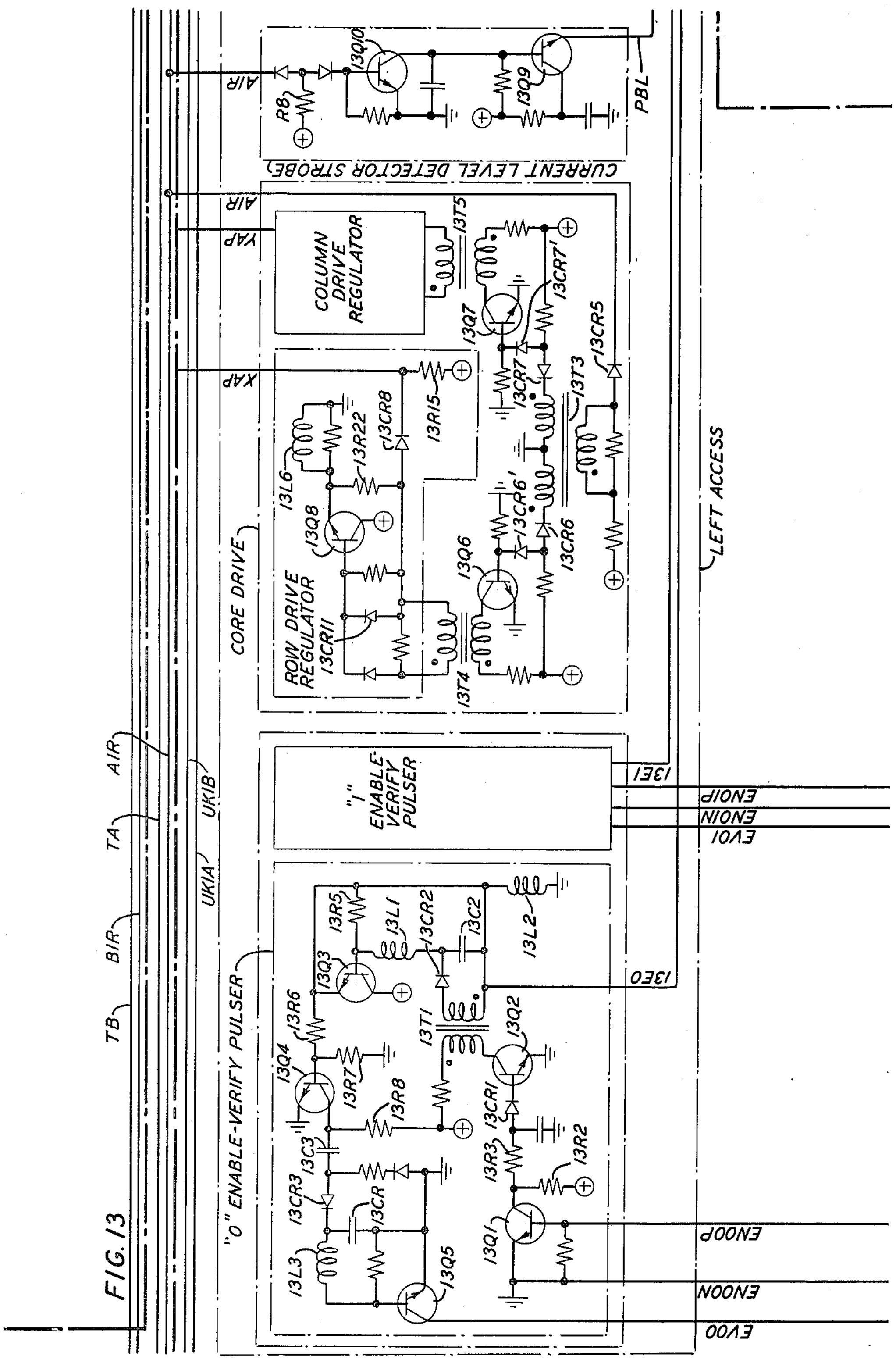
Figure 14:
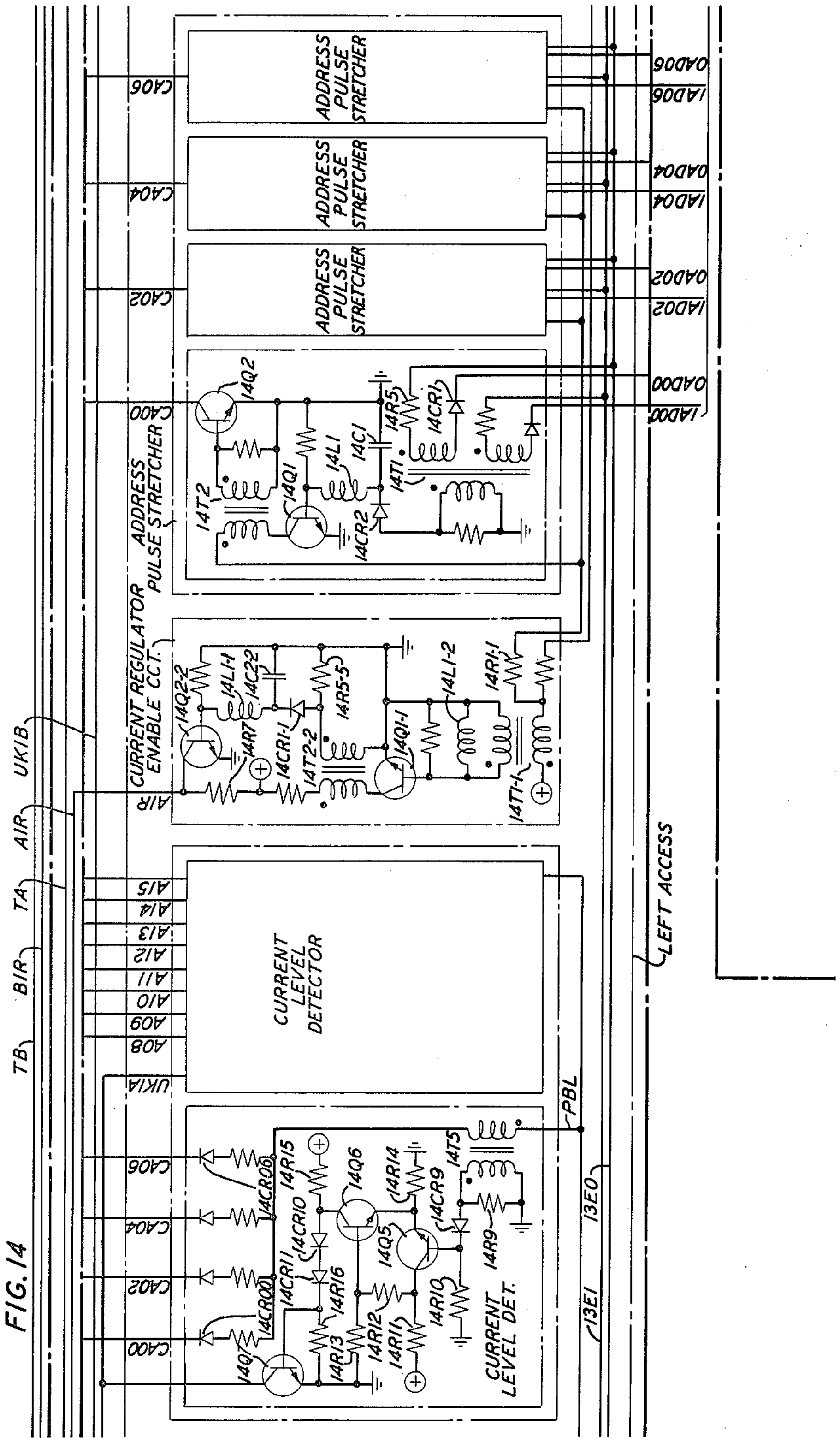
Figure 15:
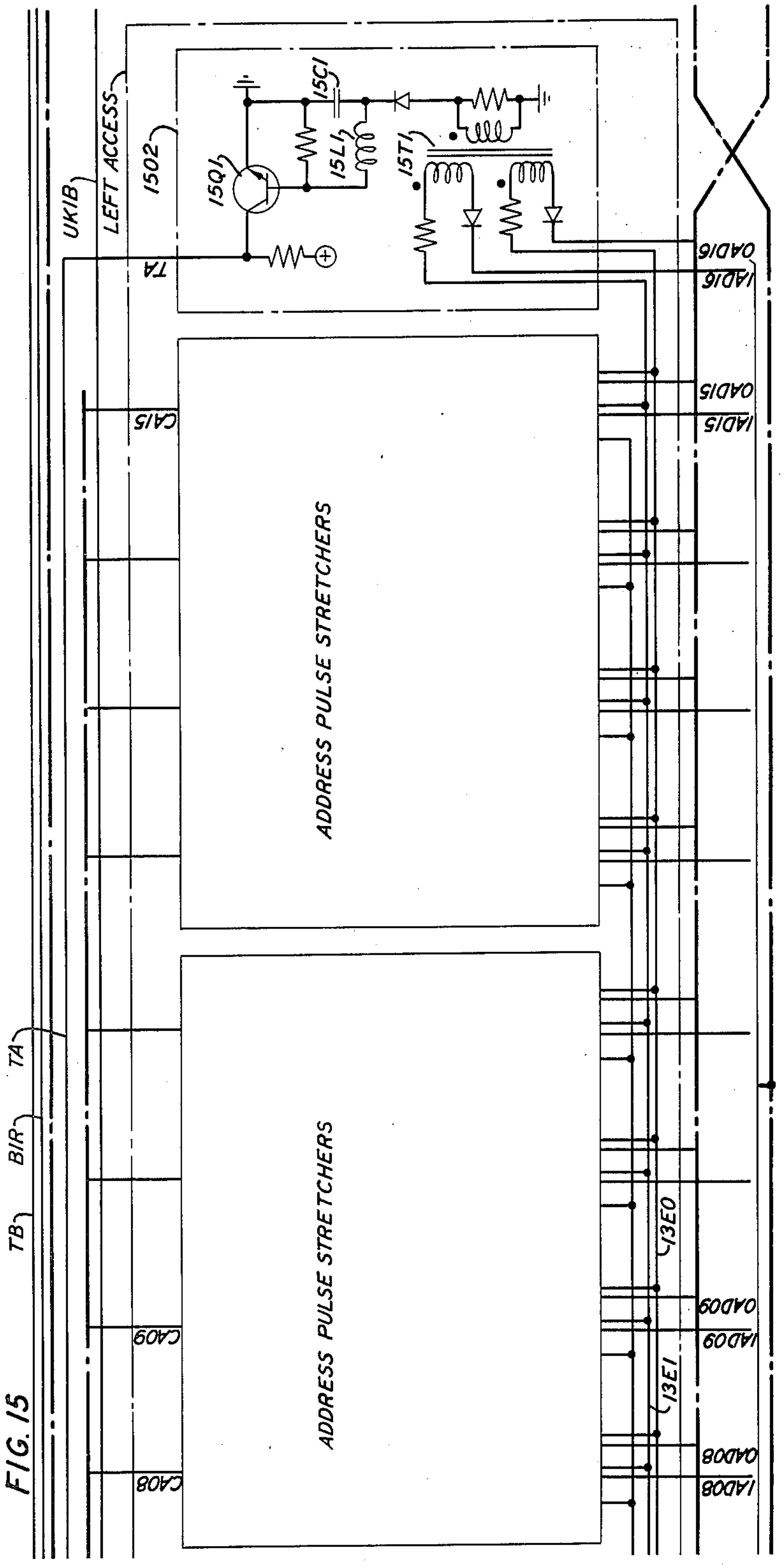
Figure 16:
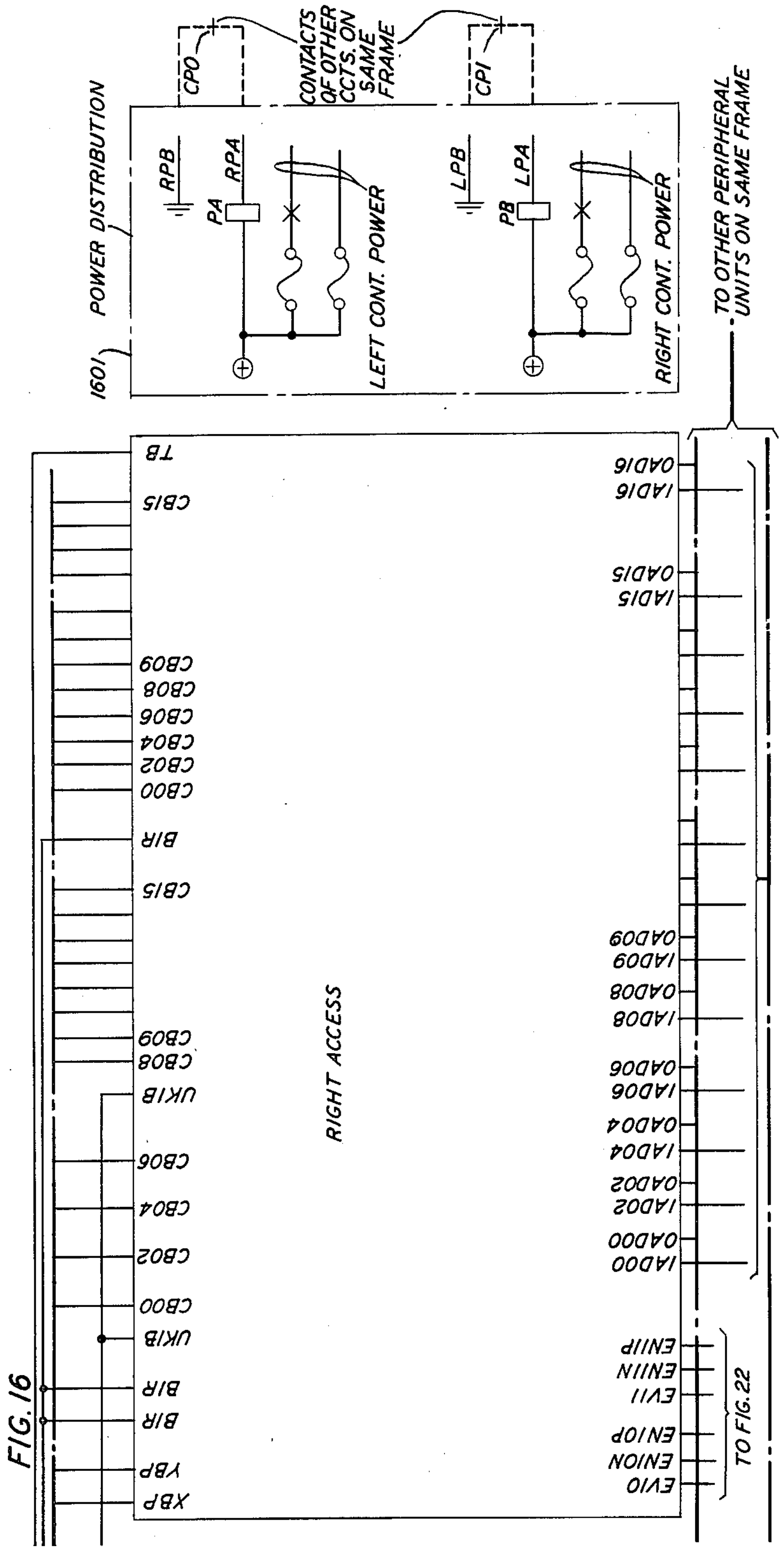
Figure 17:
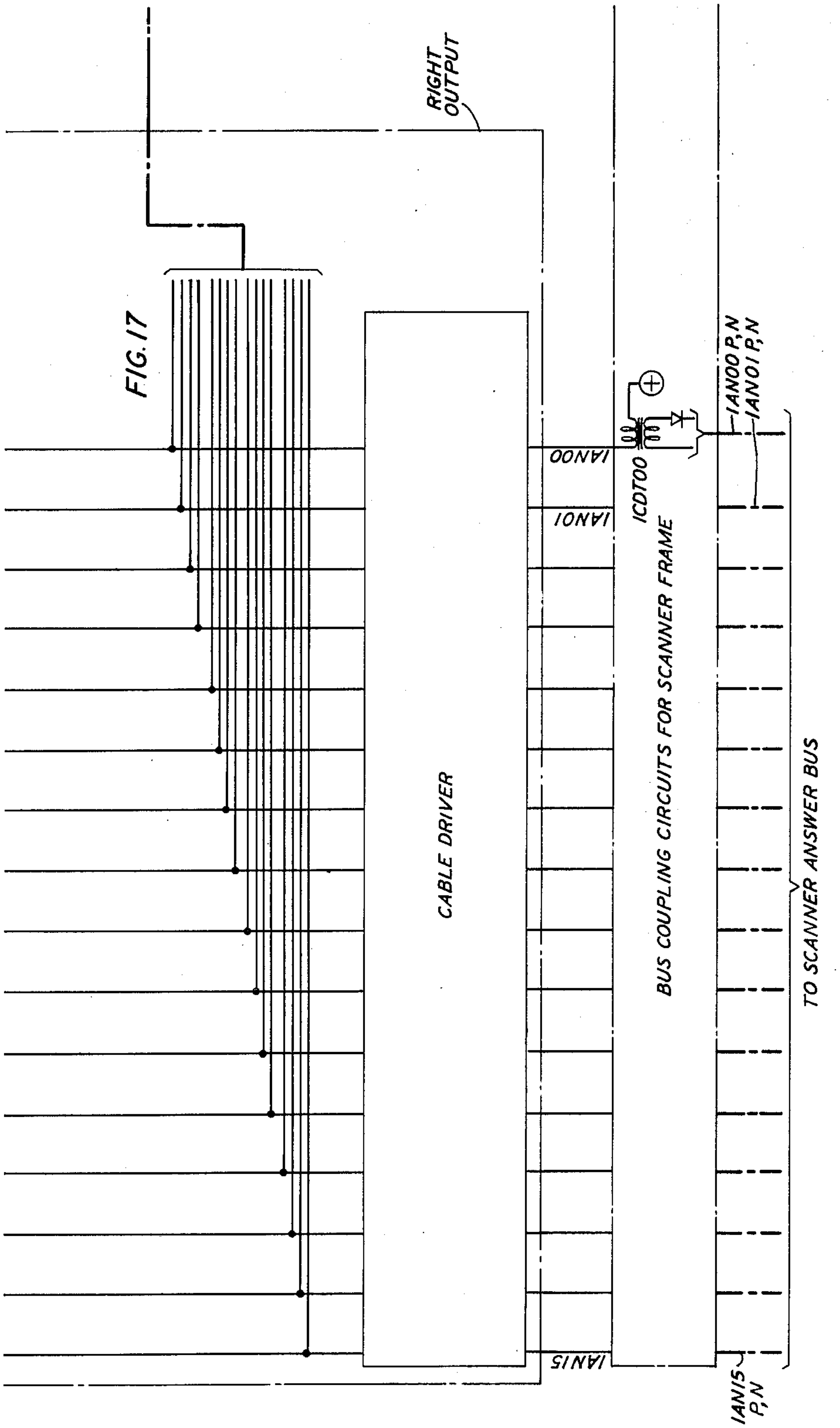
Figure 18:
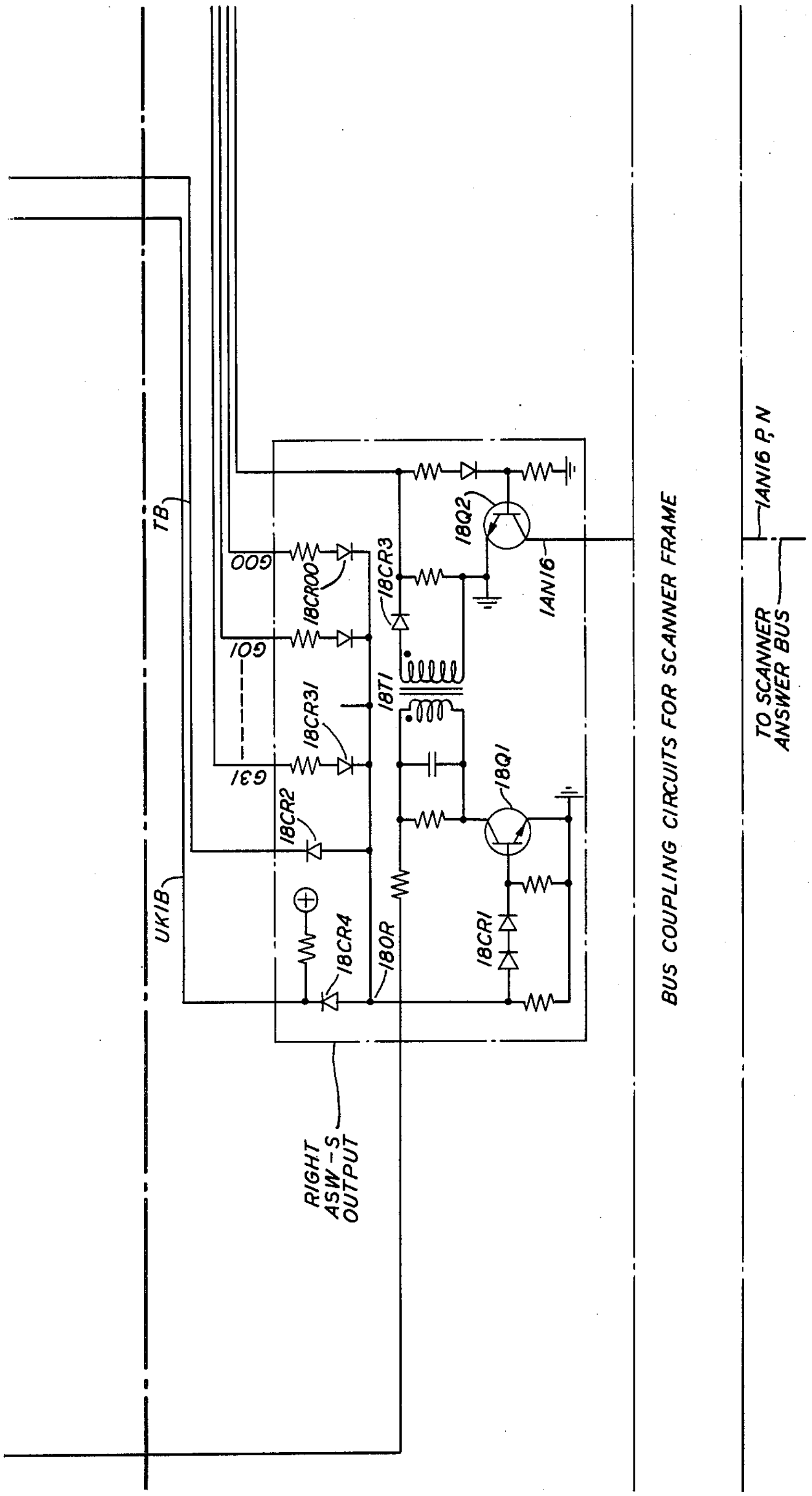
Figure 19:
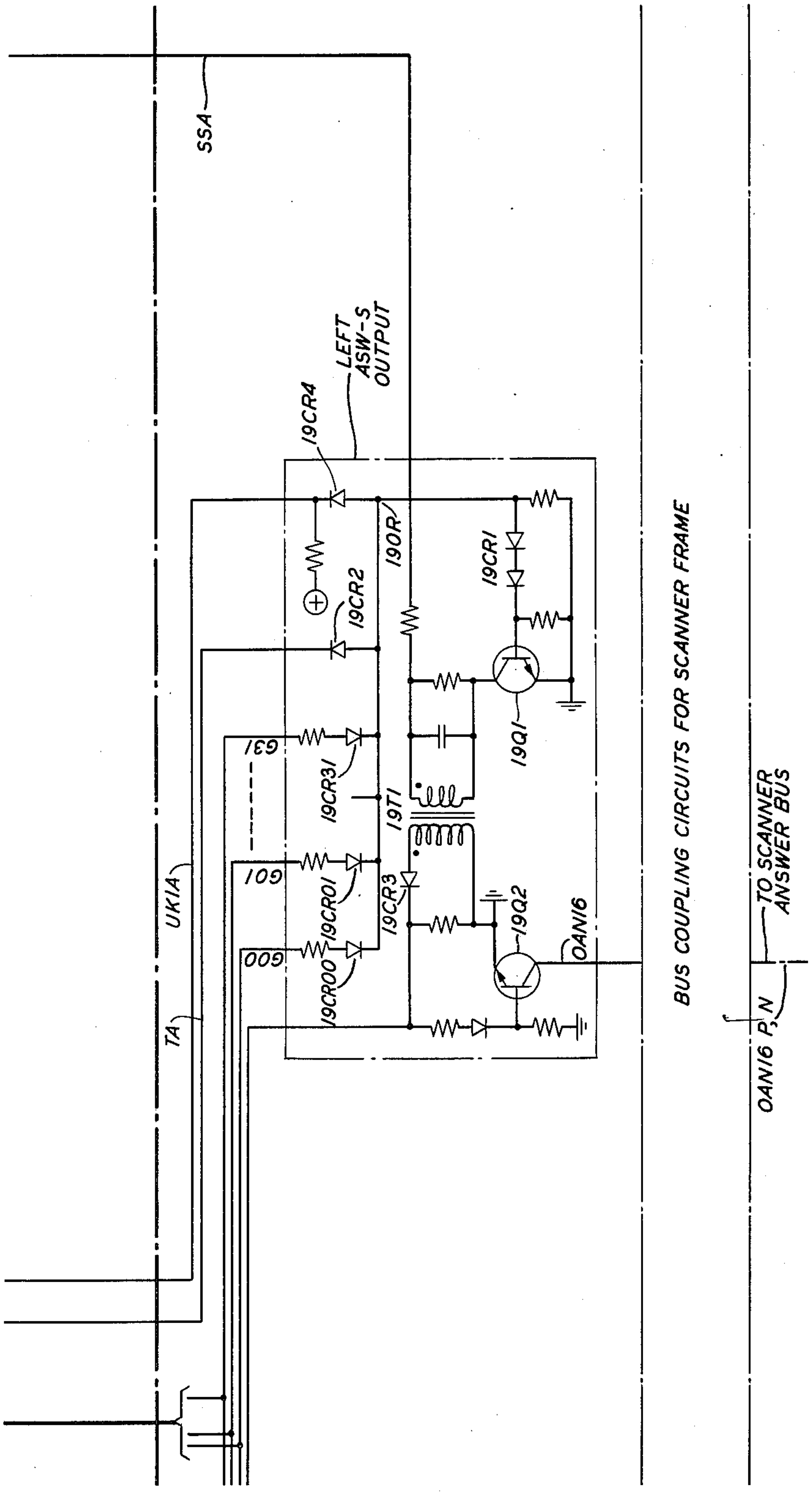
Figure 20:
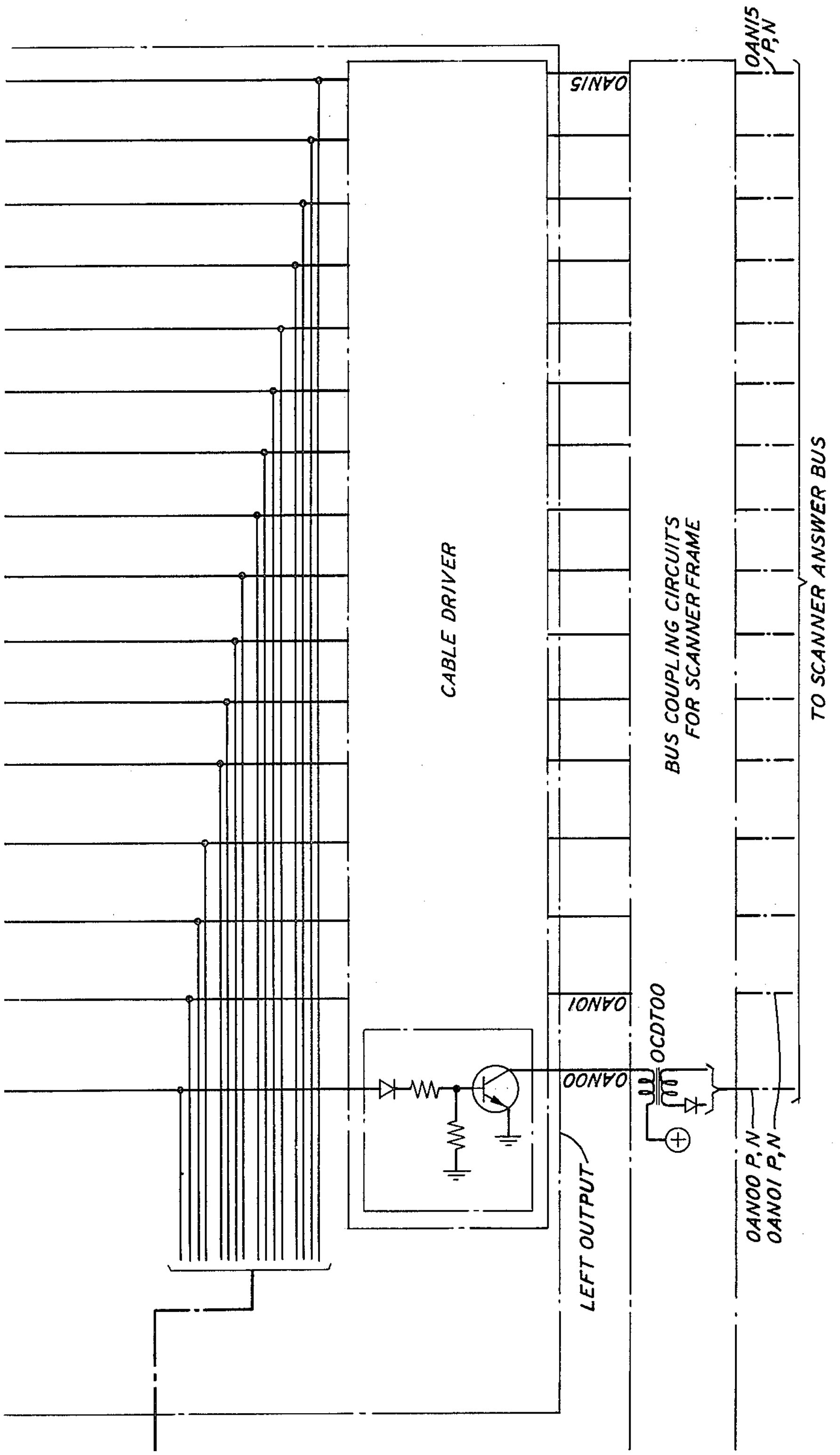
Figure 21:
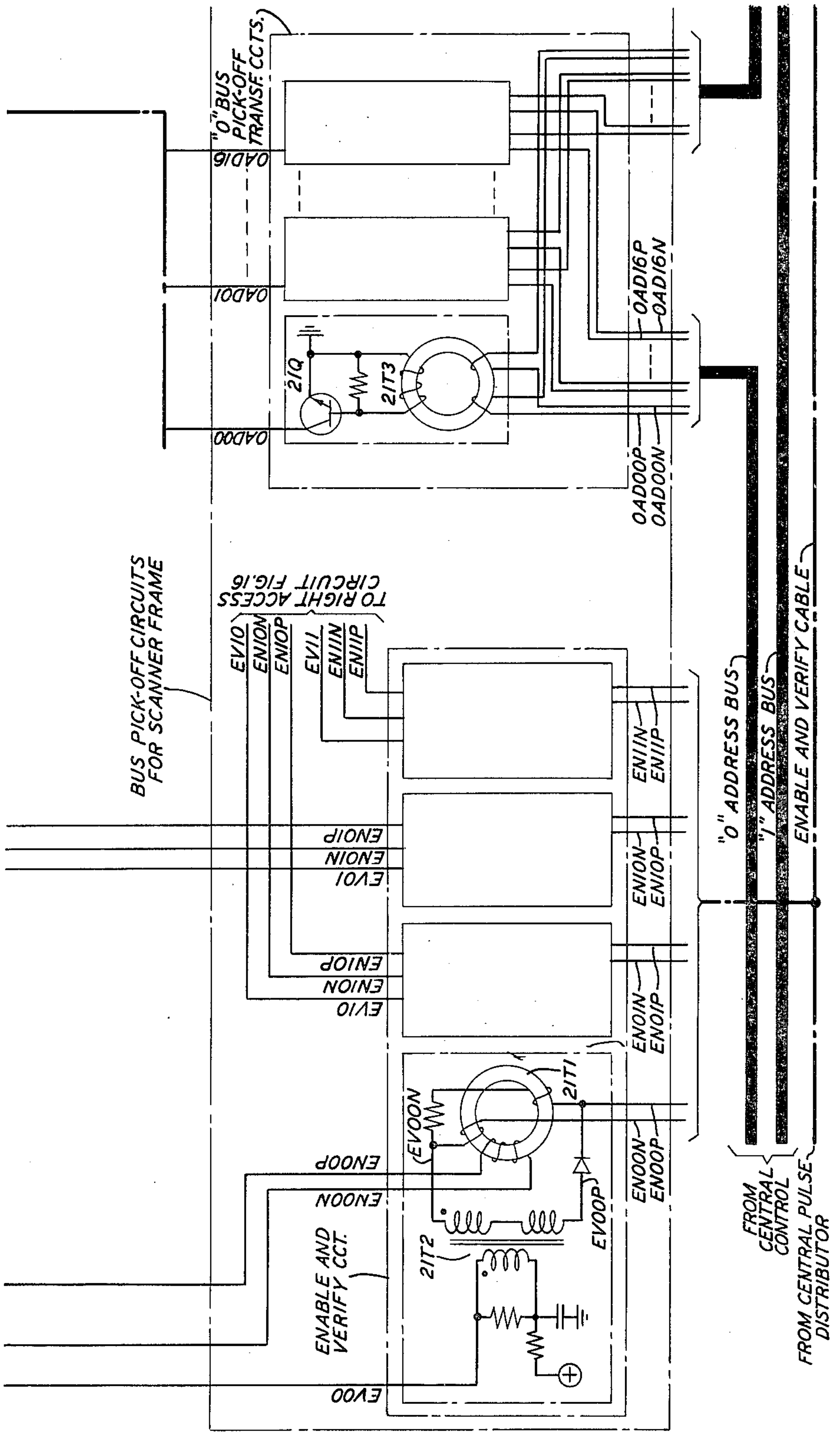
Figures 22, 23:
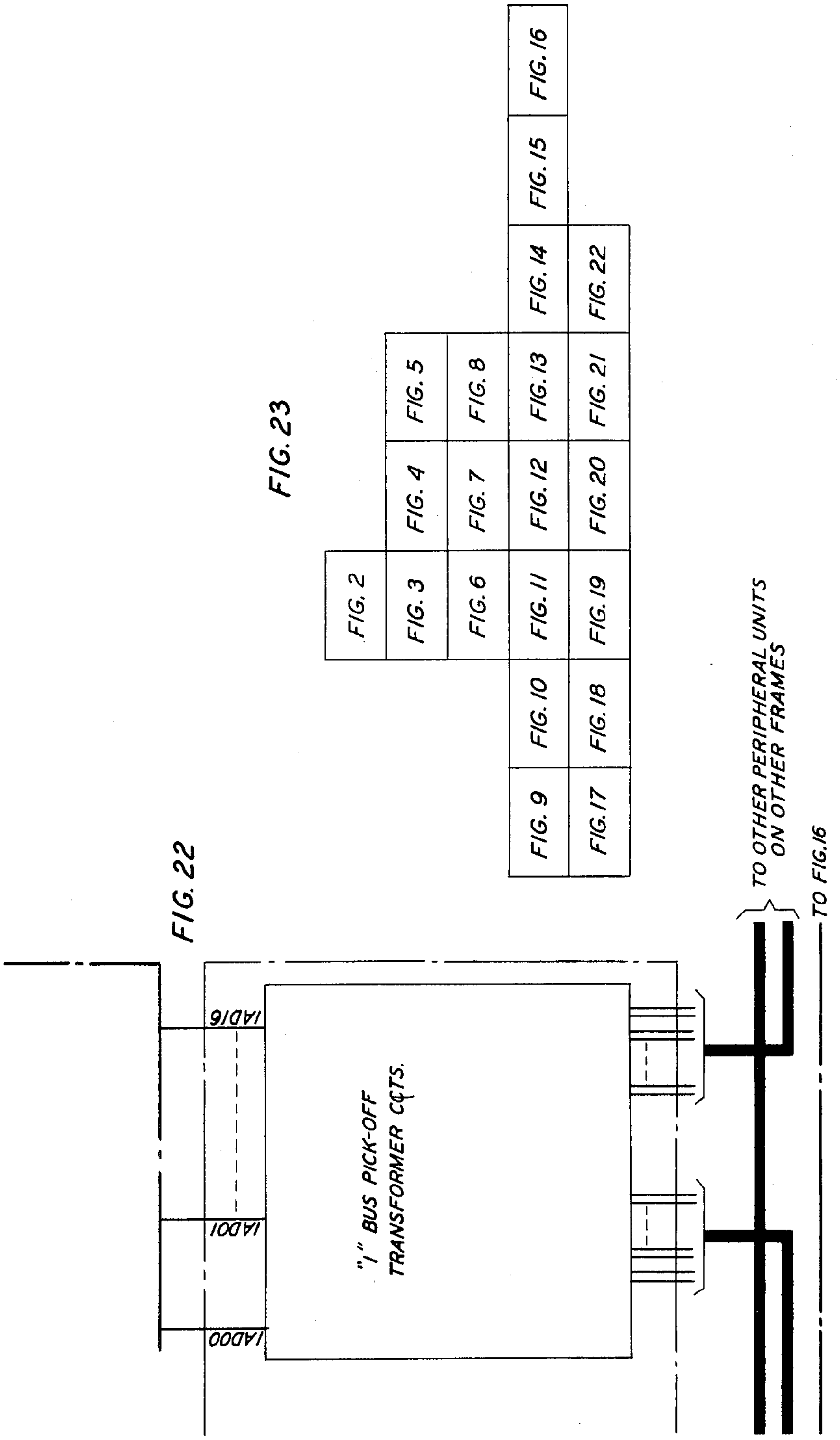

FIGS. 13, 14, and 15 show the input access circuitry for the "0" controller;

FIG. 16 shows the input access circuitry for the "1" controller;

FIGS. 17 and 20 show the output cable drivers for the "1" and "0" controllers, respectively;

FIGS. 18 and 19 show the "ASW-S" output circuits of the "1" and "0" controllers, respectively;

FIGS. 21 and 22 show connections to the peripheral communications bus; and

FIG. 23 shows the relationship of FIGS. 2 through 22.

CONTENTS

I. General Description (FIGS. 1A, 1B, 1C, and 1D)
II. Detailed Description
  1. Access Circuits 1300–1500 and 1600 (FIGS. 13, 14, 15, 16, 21, 22)
    (a) Enable-Verify Pulser (FIG. 13) and Peripheral Communications Bus Circuit (FIG. 21)
    (b) Address Pulse Stretcher Circuits (FIGS. 14, 15, 16)
    (c) Core Drive Circuits (FIG. 13) and Current Regulator Enable Circuit (FIG. 14)
    (d) Coincident Current Magnetic Core Access Switch Matrices 4000–7000 and 5000–8000 (FIGS. 4, 5, 7, 8)
  2. Ferrod Matrix 2000–6000 (FIGS. 2, 3, 6)
  3. ASW-S Output Circuits 1800 and 1900 (FIGS. 18, 19) and Current Level Detector Circuits (FIG. 14)
  4. Scanner Answer Output Circuits 900–1700 and 1100–2000 (FIGS. 9, 10, 17, 11, 12, 20)
  5. Maintenance Testing

I. GENERAL DESCRIPTION (FIGS. 1A, 1B, 1C, AND 1D)

Figure 1A:
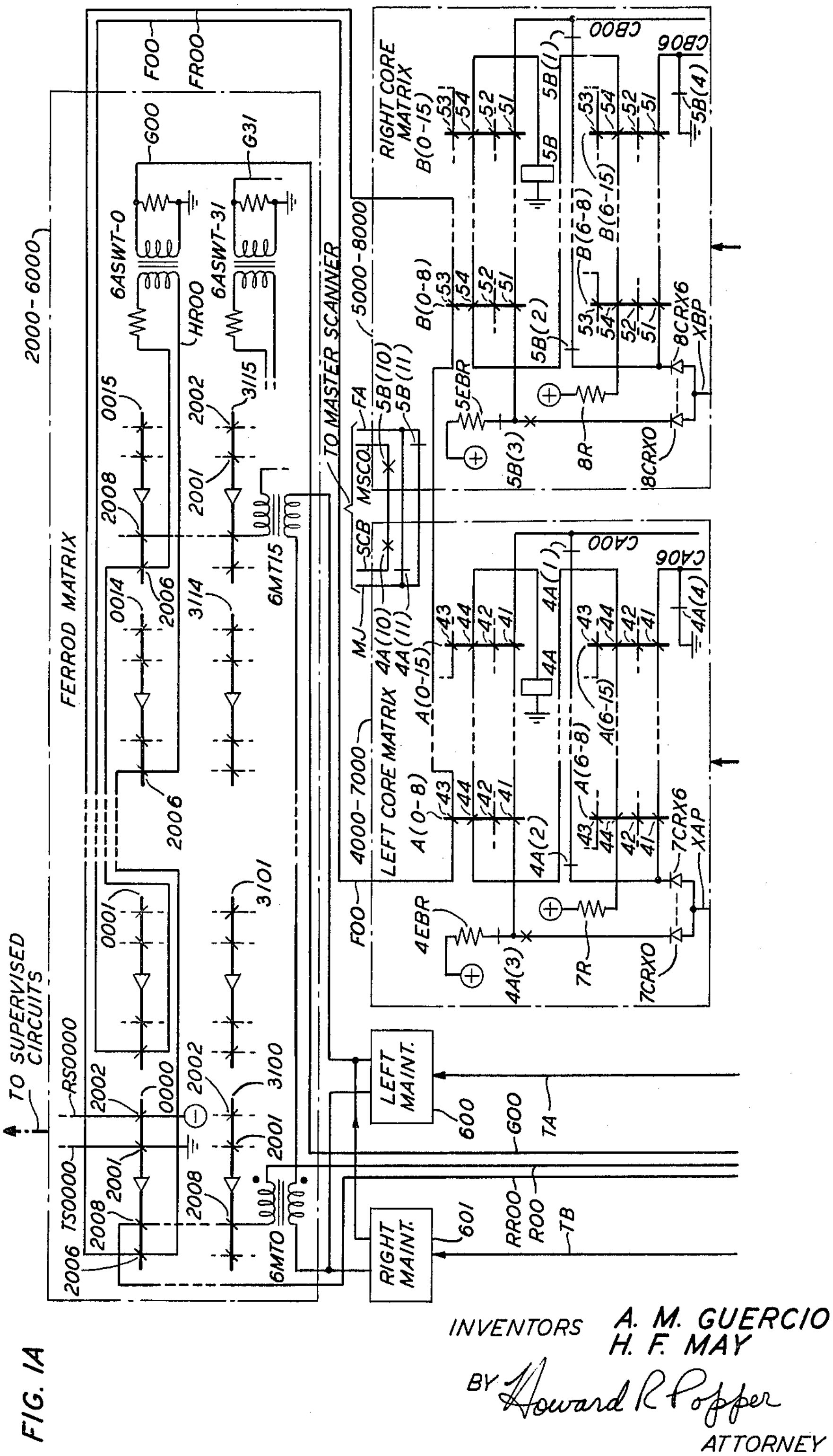
Figure 1B:
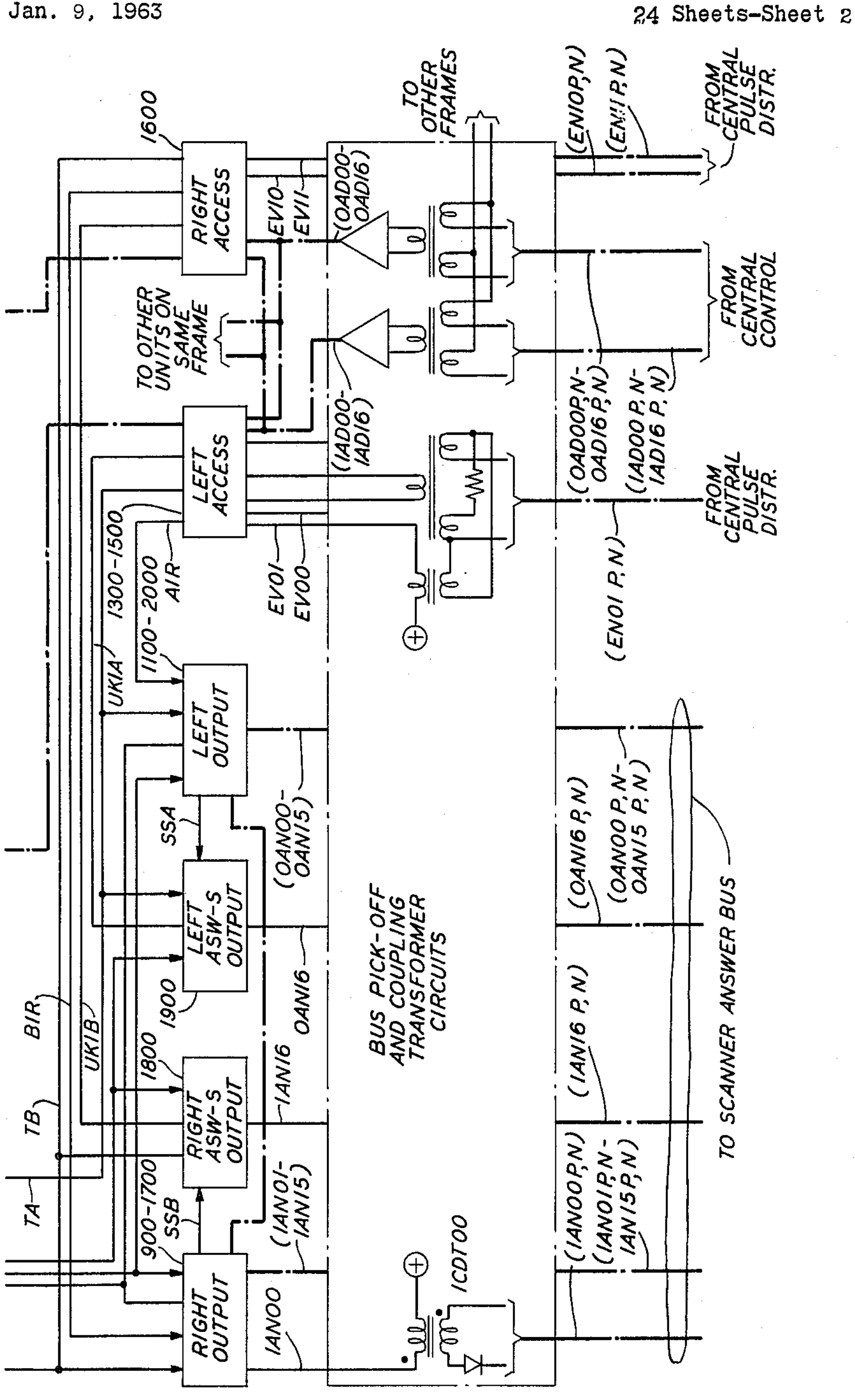

Referring now to FIGS. 1A and 1B, there is shown in block diagram form an illustrative embodiment of the present invention. Insofar as possible, the same numbers will be used to designate apparatus in FIGS. 1A and 1B as are subsequently employed to designate the detailed showings of the corresponding apparatus in FIGS. 2 through 22.

In the ensuing description the terminology which has been adopted to describe units of apparatus which appear in pairs is a combination of the designations which are used throughout the system as a whole. For example, the convention has grown up in the electronic switching system of designating the two peripheral communications buses, either of which may supply address information to the scanner, as the "0" and the "1" bus. The pair of control circuits of the scanner have similarly been designated the "0" and the "1" controller, respectively. In order to avoid confusion, it has been found helpful sometimes to characterize the component circuits of the controllers as "left" and "right" component circuits, and, in fact, in one illustrative embodiment the physical layout of the component circuits actually does follow this positioning. In general, all circuits having the prefatory designation "left" (such as the left access, left core matrix, left output, etc.) are components of the "0" controller, and those having the prefatory designation "right" are components of the "1" controller. Additionally, the designations A and B are used to distinguish circuit elements of the "0" or left controller from those of the "1" or right controller. Examples of this may be found in FIG. 1A, for example, in the designation of the bias monitoring relay for the left core matrix as relay 4A and the designation of the corresponding bias monitoring relay of the right core matrix as relay 5B. Examples of similar usage are illustrated by leads AIR and BIR, SSA and SSB, TA and TB, etc. Except when noted, therefore, the terms left, "0", and A may be treated synonymously and the terms right, "1", and B may be treated synonymously.

Figure 2:
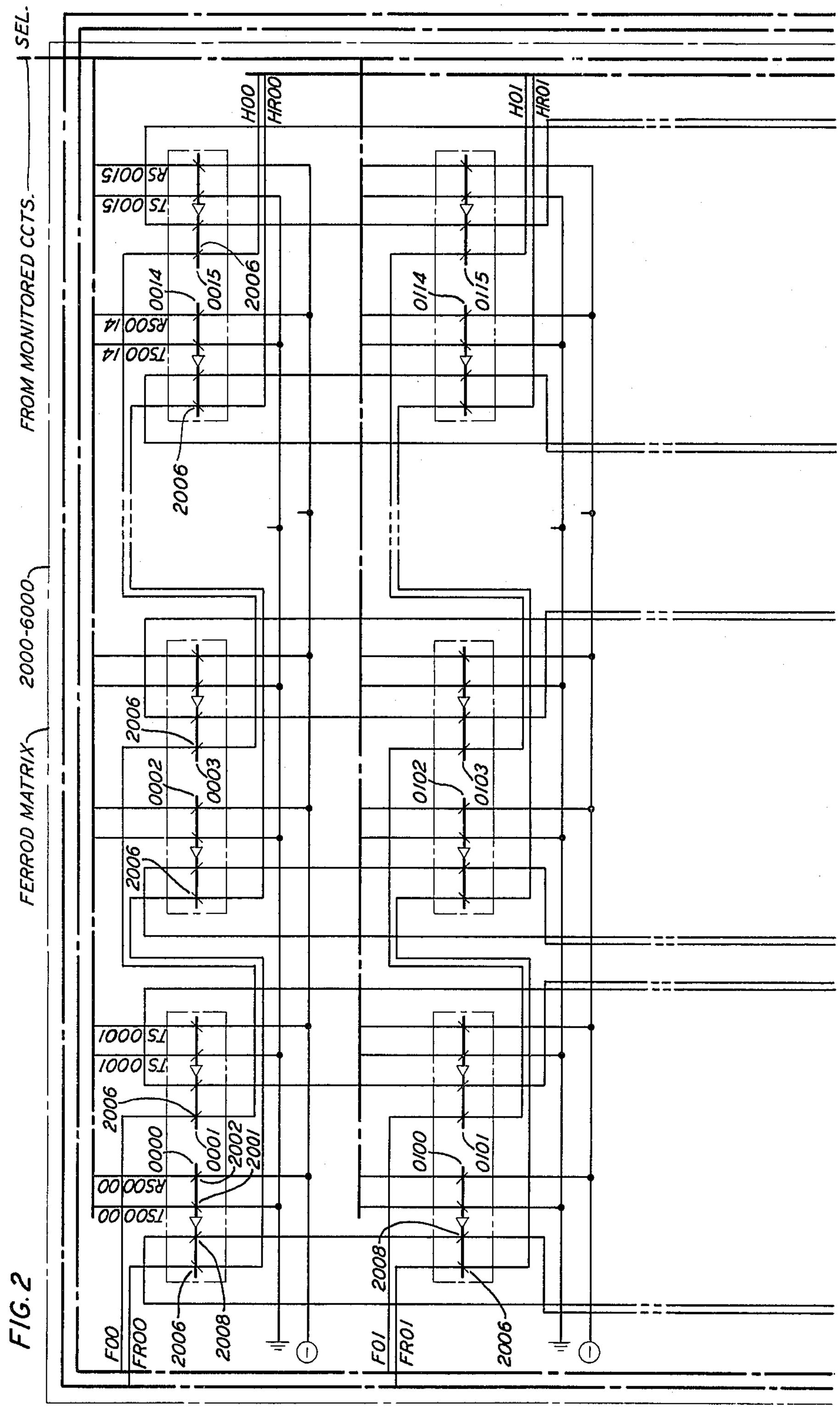
Figure 3:
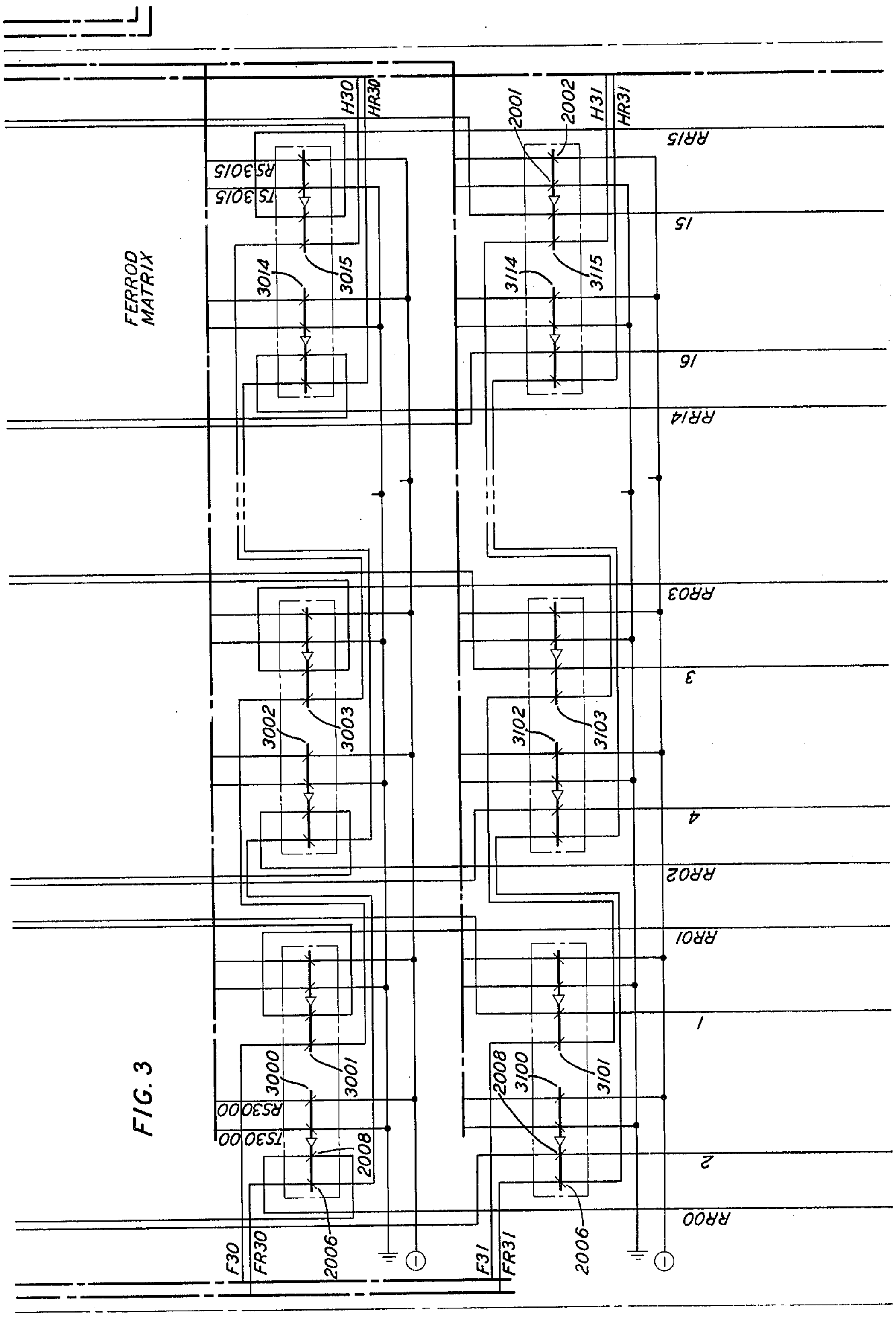
Figure 6:
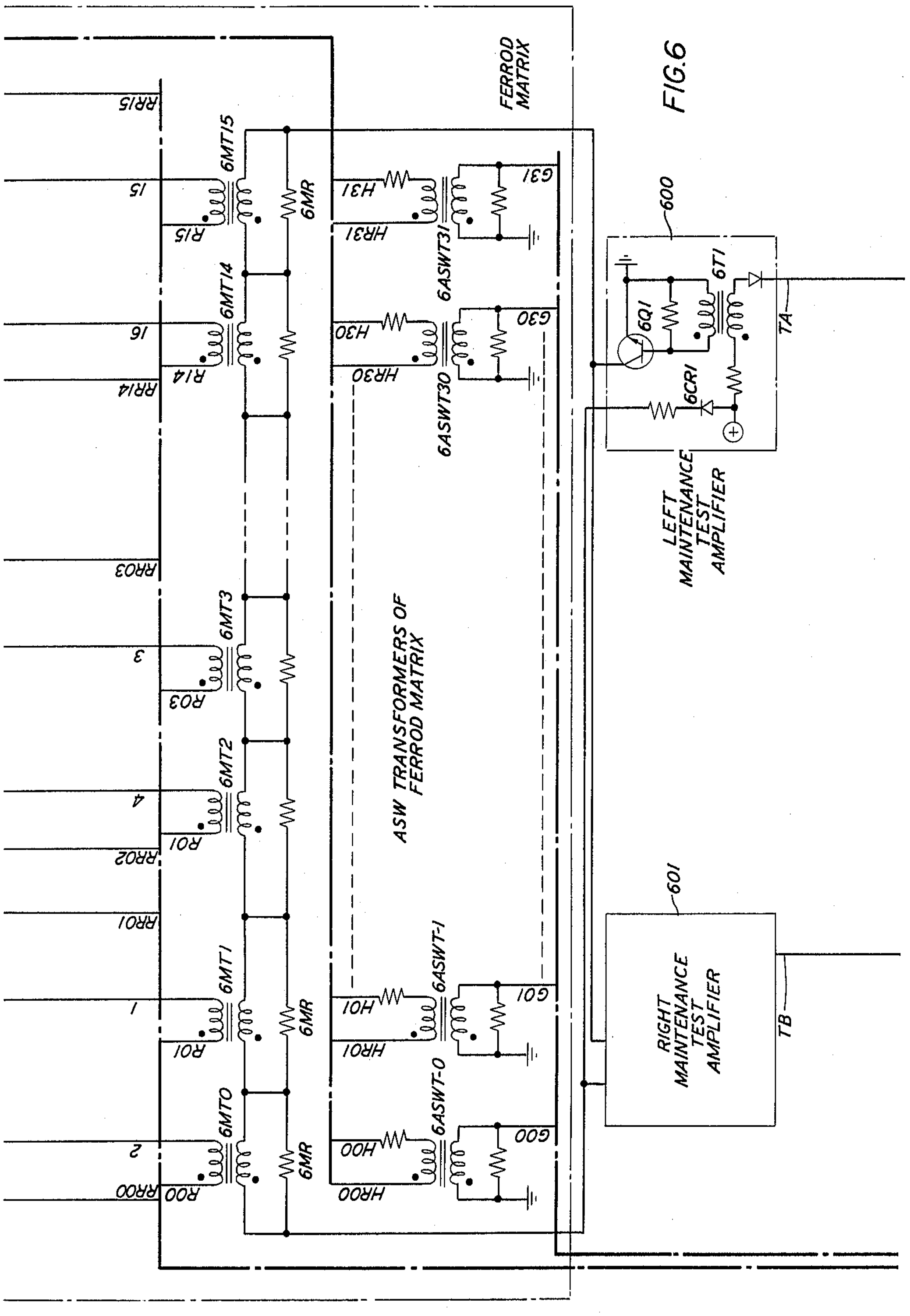

The circuits monitored by the scanning apparatus are each connected to the control windings of an individual ferrod in ferrod matrix 2000–6000, FIG. 1A. The full details of the ferrod matrix are shown in FIGS. 2, 3, and 6.) For the sake of simplicity, only the first two and last two ferrods of the first and last row are shown in FIG. 1A. Further, connections to the control windings 2001, 2002 of only one ferrod (0000) and only a portion of one interrogate loop F00–FR00 and of one readout loop R00–RR00 circuit are shown in order to simplify the illustration. The ferrods in the ferrod matrix advantageously may be arranged so that every two ferrods are assembled in a single plastic case. For example, ferrods 0000 and 0001 could be assembled in one plastic case and ferrods 0014 and 0015 would be assembled in another case. In this manner a row of sixteen ferrods would be contained in eight plastic case assemblies. Ferrod 0000 has its control winding 2001 connected between ground and one side of the remote supervised circuit (not shown). The other control winding 2002 is connected between battery and the other side of the remote supervised circuit. Windings 2001 and 2002 are connected so that when a current path is completed by the remote supervised circuit, as for example by a supervised line circuit being placed in the off-hook state, the current in these windings produces mutually aiding fluxes in the longitudinal direction of ferrod 0000. Each of the other ferrods has its control windings similarly connected to a remote supervised circuit. While the battery and ground have been shown as being supplied within the ferrod matrix, it is apparent that the ends of the control windings may instead be brought out to remote battery and ground. Alternatively, only the winding having battery connected thereto, such as winding 2002, may be brought out to the remote supervised circuit as would be the case when the state of a remote ground start line is desired to be monitored. In this case, windings 2001 and 2002 may be connected in series aiding fashion to the ground start line. Whichever of these alternatives may be adopted in a particular situation, the type of ferrod selected is one which will undergo longitudinal saturation when the associated circuit to be supervised is in the busy, active, or off-hook condition. Sufficient data for selecting the geometry required and the ferrod stick for these purposes is disclosed in the above-mentioned Baldwin-May application.

Figure 1C:
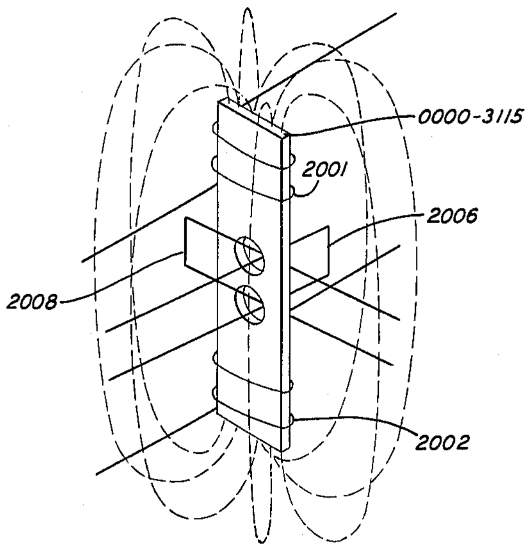
Figure 1D:
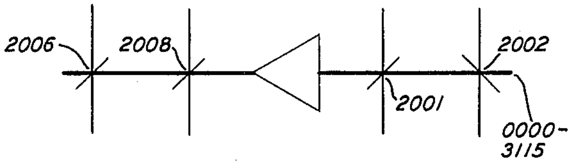

Because the ferrod devices of the scanner are arranged in an array, a new symbol has been adopted which better lends itself to compact schematic circuit representation than the pictorial representation employed in the original ferrod disclosure. FIG. 1C shows the pictorial representation of a ferrod. The control windings 2001 and 2002 are coaxial with the stick and when energized cause it to be longitudinally saturated. Interrogate conductor 2006 threads the apertures of the ferrod and when the ferrod is unsaturated will cause a signal to be induced by remanent flux switching transformer action in readout conductor 2008. FIG. 1D shows the schematic representation using corresponding reference numerals. The symbolic representation uses a combination of the well-known mirror symbolism (for the control windings 2001, 2002, and the interrogate and readout conductors 2006, 2008) with a directional arrow symbol. The use of mirror symbolism is discussed in an article by M. Karnaugh, Proceedings of the I. R. E., May 1955, page 570 et seq. The directional arrow symbol is used to show that the energized control windings 2001 and 2002 may affect the performance of, i.e., coupling between, the interrogate and readout conductors 2006 and 2008, but that the interrogate and readout conductors can never affect the performance of, i.e., induce signals into, the control windings.

The interrogate conductor 2006 of ferrod 0000 is serially connected with the interrogate winding of each of the other ferrods in the first row of the ferrod matrix. In the illustrative embodiment there are sixteen ferrods in each row and there are thirty-two rows of ferrods for a total of 512 ferrods. (Only the first and last pairs of ferrods of the first row and only the first ferrod of the last row are shown, however.) The serial connection of the interrogate conductors 2006 of ferrods 0000 through 0015 comprise an interrogate loop F00–FR00. In the illustrative embodiment, the interrogate conductors 2006 of each of the odd-numbered ferrods of the (first) row are serially connected from lead F00 of interrogate loop F00–FR00, while even-numbered ferrods of the row are serially connected from lead FR00 of the interrogate loop. The connection from the interrogate winding of the last even-numbered ferrod 0014 to the last odd-numbered ferrod 0015 of the row is made through the primary winding of transformer 6ASWT–0. By connecting the interrogate conductors in this inter-linked chain manner, the inductance of the interrogate loop is held to a minimum and the terminal strips which would be required by manufacturing considerations are eliminated as compared to what would obtain were the conductors 2006 of the interrogate loop connected in straight line series fashion.

Pulses are applied to interrogate loop F00–FR00 by the switching of an access core in either core matrix 4000–7000 of the "0" controller or core matrix 5000–8000 of the "1" controller. The particular core of the core matrix which is switched is determined by coincident current energization of row and column select windings in the core matrices. The row and column select windings are, in turn, energized by addresses supplied the access circuits 1300–1500 and 1600 (FIG. 1B) by the address leads 0AD00–0AD15 or 1AD00–1AD15 of the bus pick-off and coupling transformer circuit. For the sake of simplicity, the connections to the column drive windings of the core matrices have been omitted. Whether access circuit 1300–1500 shall receive address information and whether such information shall be received from address leads 0AD00–0AD15 or from address leads 1AD00–1AD15 is determined by whether enable lead pair EN00N, EN00P or EN01N, EN01P is energized by central control via the central pulse distributor (not shown). Similarly, whether access circuit 1600 shall receive address information and whether such information shall be received from address leads 0AD00–0AD15 or 1AD00–1AD15 is determined by whether enable lead pair EN10N, EN10P or EN11N, EN11P is energized by central control via a central pulse distributor.

Let it be assumed that the left-hand access circuit 1300–1500 (FIG. 1B) for the "0" controller has been selected to receive address information. Pulse forming circuits (the "address pulse stretchers", shown detailed in FIG. 14) of the access circuit ground one of the row drive leads, such as lead CA00 to the left core matrix 4000–7000, FIG. 1A. Another pulse forming circuit (the core drive detailed in FIG. 13) of the access circuit applies regulated battery to lead XAP. A current path is completed which may be traced from the battery applied in access circuit 1300–1500 to lead XAP, diode 7CRX0, the make contact of transfer contacts 4A(3), winding 41 of core A(0–8), intermediate windings 41 of other cores (indicated by dashes), winding 41 of core A(0–15), to the ground applied by access circuit 1300–1500 to lead CA00. The current flowing in winding 41 of core A(0–8) is of half-select magnitude. Similarly, let it be assumed that a half-select current is applied by the column drive circuit (not shown) to winding 42 of core A(0–8). The core A(0–8), in response to these simultaneously applied half-select currents, switches to the set saturation state from the reset saturation state established by the bias current in bias winding 44. Bias monitoring relay 4A is normally maintained operated by its connection to bias battery through a bias winding 44 on each core of the matrix.

A current pulse for interrogating the ferrod array is induced in output winding 43 of core A(0–8), making lead F00 of interrogate loop F00–FR00 positive with respect to lead FR00. Relay 4A being normally operated, its back contacts 4A(1) and 4A(2) normally maintain lead CA00 separated from the windings of intermediate cores connectable between these contacts. Accordingly, access circuit 1300–1500, when grounding lead CA00, will apply a half-select current only to the row of cores which includes core A(0–8) but not to any other row of cores. Similarly, should access circuit 1300–1500 receive address information designating that core A(6–8) should receive a half-select pulse on its row drive winding 41 (and on its column drive winding 42), lead CA06 would be grounded by access circuit 1300–1500 and normally operated back contact 4A(4) would maintain lead CA06 isolated from permanent ground.

At the termination of the row and column drive pulses applied by access circuit 1300–1500 to core matrix 400–7000, the bias current in winding 44 re-switches core A(0–8) to its reset state thereby inducing an interrogate current pulse in output winding 43 which makes lead FR00 of interrogate loop F00–FR00 positive with respect to lead F00. The interrogate current flowing in interrogate loop F00–FR00, when the state of core A(0–8) is initially switched by access circuit 1300–1500, in flowing through winding 53 of core B(0–8), induces in core B(0–8) a flux which is in the same direction as the biasing flux provided by the current in biasing winding 54. Accordingly, biasing winding 53 exhibits negligible impedance to the current produced by the switching of core A(0–8). When, at the termination of the drive current pulse applied by access circuit 1300–1500, the bias current in winding 44 makes lead FR00 positive with respect to lead F00, the direction of the interrogate current in winding 53 is such as to oppose the biasing flux due to the current in winding 54. However, the amplitude of the interrogate current pulse is insufficient to switch the magnetization state of core B(0–8) and winding 53 offers but minimal impedance to the current pulse induced by the switching of core A(0–8).

The interrogate current pulse applied to loop F00–FR00 switches the remanent magnetization state of the threaded apertures of those ferrods of the first row whose control windings 2001, 2002, we shall assume, are connected to idle lines. When the remanent magnetization state of a ferrod aperture is switched by an interrogating pulse, a readout pulse is induced in the readout conductor 2008 of that ferrod. The circuit connections to the readout conductors only for the first (0000) and last (3100) ferrod of the first column of ferrods are shown in FIG. 1A. Neglecting for the moment the effect of the secondary winding of transformer 6MT0, it is seen that the readout loop connecting readout conductors 2008 of ferrods 0000 and 3100 of the first column is connected (FIG. 1B) to both the right output circuit 900–1700 of the "1" controller and to the left output circuit 1100–2000 of the "0" controller. A similar readout loop (detailed in FIGS. 2 and 3) connects the readout conductors of the other fifteen columns of ferrods with both of these output circutis.

The output circuit which is chosen to deliver to the bus coupling circuit the supervisory information obtained by the ferrod matrix is determined by whether lead AIR or lead BIR is energized and this is, in turn, determined by whether the access circuit 1300–1500 of the "0" controller or access circuit 1600 of the "1" controller was initially provided with the address information. The pulse applied to either lead AIR or BIR is delayed and shaped in the respective output circuit and then gates the output circuit to respond to the readout signals from the ferrod array. Although the readout loop provides information to both the left and right output circuits, the energization of either lead AIR or BIR allows only one of these output circuits to respond. Cable drivers within the responding output circuit, however, provide duplicate answer response information to the corresponding ones of leads 0AD00–0AN15 and 1AN00–1AN15. The information provided on these output leads is converted to the balanced form necessary for transmission over the leads of the peripheral communications bus by the bus pick-off transformer circuit. The conversion of single to balanced transmission, for the sake of simplicity, has been detailed solely for scanner answer lead 1AN00 which is converted by the cable driver output transformer 1CDT00 to lead pair 1AN00P, 1AN00N, as shown.

Accordingly, it is seen that information as to the status of sixteen monitored circuits at a time is supplied by the scanner to leads 0AN00(P, N) through 0AN15(P, N) of the "0" scanner answer bus and to leads 1AN00(P, N) through 1AN15(P, N) of the "1" scanner answer bus. In addition to, and simultaneously with, information which is, of course, dependent upon the state the supervised circuits, the scanner also provides a routine indication of proper ferrod matrix interrogation. The development of this routine indication will now be described.

The current pulses applied to interrogate loop F00–FR00 are transformer couple by transformer 6ASWT–0, (FIG. 1A) whose primary winding is in series with loop F00–FR00, to lead G00. Lead G00 is connected to the ASW–S output circuit 1900 for the "0" controller and to the ASW–S output circuit 1800 for the "1" controller. A similar transformer (shown detailed in FIG. 6) is connected from each of the other interrogate loops to the ASW–S output circuits 1800 and 1900. ASW–S output circuits 1800–1900 (FIG. 1B) verify that only one interrogate loop at a time is energized by access circuit 1300–1500 or by access circuit 1600. When a row of ferrods has been so uniquely interrogated (regardless of the state of the circuits monitored by the ferrods of the interrogated row) both ASW–S output circuits 1800 and 1900 ground their respective lead 1AN16 and 0AN16 to the scanner answer buses to inform the central control of this fact. The ASW–S output circuit 1900 is gated by a 0.5 microsecond pulse applied to the SSA lead approximately 1.4 microseconds from the onset of the 3.0 microsecond ground pulse applied to the AIR lead of output circuit 1100–2000 by access circuit 1300–1500. The pulse on the SSA lead also gates the information obtained from the sixteen ferrods of the interrogated row to the answer leads 0AN00–0AN15 and 1AN00–1AN15 to the scanner answer bus.

While so far it has been assumed that the scanner controllers are operating normally, it is essential that a failure in either controller not deprive of service any of the lines monitored by the ferrod matrix. Were a controller to fail in the absence of some remedial procedure, the status of none of the lines monitored by the ferrod matrix would be ascertainable and an unduly large percentage of the lines served by the switching system would be denied proper service. If an output winding of a core matrix were to become open-circuited, only the sixteen lines of the interrogate loop would be affected. However, if the bias winding of any core of a core matrix were to become open-circuited, all of the lines monitored by the ferrod matrix would be denied proper service. In this illustrative example of the basic switching system, 512 lines are supervised, and denial of proper service to such a large number of lines due to failure of a single component would not be in keeping with desired standards of telephone practice. Accordingly, the bias current in the windings 44 of core matrix 4000–7000 is monitored by relay 4A which remains operated so long as the bias windings remain intact. Similarly, relay 5B remains operated so long as all of the bias windings 54 of core matrix 5000–8000 remain intact. If for any reason continuity of the bias windings of either core matrix is interrupted, the respective relay 4A or 5B releases.

Let it be assumed that relay 4A is released by bias failure in core matrix 4000–7000. Back contact 4A(3) released connects emergency bias battery and resistor 4EBR to the left-hand side of the row of drive windings 41 including winding 41 of core A(0–8) and winding 41 of core A(0–15). The other end of this row of drive windings is connected by released back contacts 4A(1) and 4A(2) to intervening rows of drive windings (indicated by dashes) and thence to the winding 41 of core A(6–8) at its left-hand side. The right-hand side of this winding is connected to ground through the other drive windings of the last row in series with released back contact 4A(4). Accordingly, an emergency bias loop is provided utilizing the normal row drive windings of the cores of core matrix 4000–7000. Failure of bias in the core matrices is detected by the interruption of continuity between leads SCB and MSC0 at the master scanner (not shown) in which these leads control ferrod windings similar to windings 2001, 2002 of the line scanner herein described. The response of the master scanner ferrod (not shown) to the interruption of continuity on these leads is interpreted by central control in accordance with its programing. This programing may determine that the previously addressed scanner should be readdressed at least one more time and following the readdressal and the continued interruption of continuity, the programing may determine that the standby controller should now be addressed. Assuming the latter to be the case, row and column drive windings of core matrix 5000–8000 would be addressed to switch core B(0–8) whose output winding 53 is in series with the interrogated loop F00–FR00 for the desired row of ferrods. Output winding 43 of core A(0–8) is maintained in the low impedance state when core B(0–8) is being switched because of the emergency bias current provided to its normal row select winding 41 over back contacts of relay 4A.

It is to be noted that the direction of the bias field provided by the emergency biasing of winding 41 is opposite to that which would be produced by the normal biasing current in winding 44. Nevertheless, the impedance of output winding 43 is maintained low during both the setting and resetting of core B(0–8). While the emergency bias applied to winding 41 could conceivably be applied in such manner as to have the emergency bias flux in the same direction as the normal bias flux, the instant arrangement provides an additional safeguard: The release of a bias relay is interpreted by central control (not shown) in such a manner that it would not normally re-address the controller having the released relay. If for any reason central control does in fact re-address that controller, the half-select current applied is in the same direction as the emergency bias and no cores switch. Since no cores switch, no interrogate pulse is applied to the 6ASWT– transformers and central control does not receive the normally expected ASW–S signal.

In addition to the (ASW–S) signal provided to leads 1AN16 and 0AN16 to the scanner answer bus during the normal interrogation of the ferrod matrix, it is desired to provide from time to time test exercises to further insure that the scanner is operating correctly. This is accomplished by employing maintenance test amplifiers 600 or 601 either of which may be addressed by signals applied from central control to either lead pair 1AD16 (P, N) or 0AD16(P, N). Assuming the left maintenance test amplifier 600 to be addressed, a current pulse is applied to the serially-connected, primary windings of a plurality of maintenance test tranformers of which only the first 6MT0 and last 6MT15 have been illustrated for the sake of simplicity.

The secondary of transformer 6MT0 is connected in series with the readout conductors 2008 of the first column of ferrods of ferrod matrix 2000–6000. For the sake of simplicity, only the readout conductors 2008 for the first ferrod 0000 and the last ferrod 3100 have been shown. The energization of the primary winding of transformer 6MT0 causes a pulse to be induced in series with the readout loop R00–RR00 for the first column of the matrix. A similar pulse is caused to be induced in each of the readout loops of the other columns of the ferrod matrix by transformers corresponding to the illustrated transformers 6MT0 and 6MT15. In the illustrative embodiment there are a total of sixteen such readout loops and accordingly the sixteen output detector amplifies in both the "0" or left output circuit 1100–2000 and of the "1" or right output circuit 900–1700 should all be operated. Failure of all circuits to operate under these conditions is interpreted by central control analyzing the pattern of signals returned on scanner answer leads 0AN00(P, N)–0AN15(P, N) and 1AN00 (P, N)–1AN15(P, N). In addition to the test exercise condition, a further assurance of correct scanner operation is provided by leads MJ, SCB, MSC0, and FA. These leads are associated in the illustrated scanner with contact 4A(10) and 4A(11) of relay 4A and with contacts 5A(10) and 5A(11) of relay 5A. Leads SCB and MSC0 are paired and are connected to the control windings 2001, 2002 of a ferrod in the master scanner (not shown). Leads MJ and FA are similarly connected. The master scanner is a scanner substantially identical to the one illustrated but is connected to monitor the condition of scan points which reflect the quality of operation of the various units throughout the switching system. The results of master scanner operation are returned to central control (not shown) over its respective scanner answer leads. In this manner central control is given information which enables it to keep track not only of the status of lines, trunks, etc., but also of the status of circuits, such as the illustrated scanner, which inform central control of the status of these same lines, trunks, etc.

II. DETAILED DESCRIPTION

1. *Access circuits 1300–1500 and 1600 (FIGS. 13, 14, 15, 16, 21, 22)*

(*a*) *Enable-verify pulser* (*FIG. 13*) *and peripheral communications bus circuit* (*FIG. 21*).—The central pulse distributor (not shown), as instructed by central control (not shown), energizes one of the four pairs of enable leads entering the scanner circuit at FIGS. 13 and 16 to designate which of the two controllers of the scanner shall receive address information and whether the address information shall be received from the leads of the "0" or of the "1" peripheral communication bus. A pair of enable leads consists of an EN—P lead and an EN—N lead. When the central pulse distributor applies an energizing pulse to such a pair, it makes the EM—P lead positive with respect to the EN—N lead for approximately 0.5 microsecond. For example, let it be assumed that leads ENOOP and ENOON (FIG. 13) are energized by the central pulse distributor. Lead ENOOP is made positive with respect to lead ENOON. The significance of the zeros and ones sequence in the designation ENOOP, etc., is as follows: The first digit of the sequence designates which of the two controllers of the scanner is to receive address information. The second digit of the sequence designates which of the two peripheral communications buses is to operate (address) the controller. In FIG. 13 the enable pair ENOOP, ENOON accordingly enters the enable-verify pulser circuit of the "0" controller (to designate, when energized, that the "0" controller shall operate from the address leads of the "0" peripheral communication bus). The enable pair ENO1P, ENO1N enters the right-hand or "1" enable-verify pulser circuit of the "0" controller (to designate, when energized, that the "0" controller shall operate from the address leads of the "1" peripheral communications bus). Similarly, the enable pair EN10P, EN10N and the pair EN11P, EN11N enter the "1" controller (FIG. 16) to designate its operation by the "0" or "1" peripheral communications bus, respectively.

To simplify the presentation of the circuitry, the scanner system will be described in detail only for operation of the "0" controller by the address leads of the "0" peripheral communications bus, mention however being made from time to time of the other possible operating combinations.

The enable pair EN00N, EN00P entering the "0" enable-verify pulser comes from the (fifty-turn) secondary winding of "pick-off" transfermer 21T1 whose balanced primary windings are in series with the correspondingly labeled leads of the enable pair from the central pulse distributor. Each of the four enable pairs from the central pulse distributor is terminated in its characteristic impedance at the scanner pick-off transformer and in this manner the enable pairs differ from the address lead pairs of the peripheral communications bus. That is, each enable lead pair goes only to a single peripheral unit, but the address lead pairs "loop-through" all peripheral units are terminated in their characteristic impedance only after the last of the peripheral units is coupled to the bus.

The fifty-turn secondary winding of the pick-off transformer applies a sufficient pulse of current (of approximately 0.5 microsecond duration) to saturate transistor 13Q1 of the "0" enable-verify pulser of FIG. 13. Transistor 13Q2 is normally maintained in the ON condition by virtue of the current supplied its base-emitter battery through resistors 13R2, 13R3, and diode 13CR1. Transistor 13Q1, being turned on, at its collector grounds the junction of resistors 13R2 and 13R3 which grounds the base of transistor 13Q2 through diode 13CR1, turning transistor 13Q2 off. Transistor 13Q2, being turned off, interrupts current in the primary of transformer 13T1 causing a positive current pulse to appear at the undotted end of the secondary winding of the transformer. The positive current pulse charges capacitor 13C2 in series with diode 13CR2.

The potential built up across capacitor 13C2 is provided with an oscillatory discharge path through inductor 13L1, the path being completed by the base-emmitter path of transistor 13Q3. When transistor 13Q3 is turned on by the initial surge of the discharge of capicitor 13C2, the emitter of transistor 13Q3 is brought almost to collector battery potential. Accordingly, low impedance battery is applied by transistor 13Q3 to lead 13E0. This low impedance battery is maintained on lead 13E0 for approximately 2.0 microseconds and is determined by the initial oscillatory discharge interval of capacitor 13C2 and inductor 13L1. On the negative half cycle of the oscillatory discharge, the base-emitter junction of transistor 13Q3 provides a substantially open circuit and the path for this negative half cycle is accordingly completed through resistor 13R5. Resistor 13R5 critically damps the oscillatory discharge. The 2.0 microsecond interval, during which low impedance battery is applied to lead 13E0, will overlap the interval of the application of the address signals, to be hereinafter described, and enables the address pulse stretchers for the "0" or left controller to respond to address information from the 0AD00–0AD16 leads of the peripheral communications bus.

A similar lead, 13E1, is provided from the "1" enable-verify pulser of FIG. 13. Lead 13E1, on the other hand, would have the 2.0 microsecond battery applied to it had the enable lead pair EN01P, EN01N been energized. The battery pulse on lead 13E1 would enable the aforementioned address pulse stretchers to receive address information from the leads of the "1" peripheral communications bus.

Another function provided by the enable-verify pulser of FIG. 13 is to return a verification signal to the central pulse distributor over the enable lead pair. The verification signal is derived at the collector of transistor 13Q5 and applied to the primary of the answer-back transformer 21T2, the secondary of which is connected across the enable lead pair. When transistor 13Q3 was turned on, the voltage divider 13R6, 13R7 provides a current to turn transistor 13Q4 on, and transistor 13Q4, in turn, provides a discharge path for capacitor 13C3. When transistor 13Q3 is turned off, at the termination of the first half cycle of the oscillatory discharge, transistor 13Q4 is turned off removing the ground discharge path for capacitor 13C3. Capacitor 13C3 charges over the path from battery, resistor 13R8, diode 13CR3, capacitor 13C4, to ground. In this charging path, the potential built up across capacitor 13C4 discharges through the inductor and base-emitter junction of transistor 13Q5 and turns transistor 13Q5 on for an initial oscillatory discharge interval.

The collector of transistor 13Q5 is connected via lead EV00 to battery in series with the primary winding of answer-back transformer 21T2 whose secondary winding is connected across the enable lead pair. The secondary winding of the answer-back transformer straddles the windings of the pick-off transformer in such a manner that the verify impulse induced therein is substantially canceled in the fifty-turn secondary winding of the pick-off transformer. The receipt of the verify impulse by the central pulse distributor (not shown) approximately 2.0 microseconds after the enable signal is sent signifies to central control that the scanner has been enabled.

Inductor 13L2 is provided so that it presents a high pulse impedance to the emitter of transistor 13Q3. Should transistor 13Q3 develop an emitter-to-collector short, inductor 13L2 would saturate and lower the impedance from emitter to ground sufficiently to blow a fuse in the power distributor (FIG. 16) supplying collector battery to transistor 13Q3. This allows the trouble condition in transistor 13Q3 to be detected and prevents the access circuits of the controller from acting continuously on whatever information may be present on the address leads of the communications bus.

The verify signal on the enable lead pair EN00P, EN00N is repeated via the central pulse distributor to inform central control that the "0" enable-verify pulser has successfully put the "0" controller in condition to respond to address signals from the "0" peripheral address bus. These address signals will, however, advantageously be provided by central control to the scanner controller even before the verify signal is returned to central control so as not to delay system operation. Failure to receive the verify signal at the appointed time, however, is interpreted by central control in such manner as will enable it to disregard the response which the scanner may furnish from the address signals.

Approximately 0.5 microsecond after the enable pulse is applied to the enable lead pair, central control provides address information signals to the address leads of the peripheral communications bus. The address signals which are applied to the address lead pairs of the peripheral communications bus are applied to the scanner by pick-off transformers (FIG. 21) in similar manner to that described above in connection with the enable signals. Each pick-off transformer has its secondary connected between the base and emitter of an associated transistor, such as transistor 21Q–. The receipt of an address signal over address lead pair 0AD00P, 0AD00N causes transistor 21Q– to be turned on, thereby grounding address lead 0AD00. A similar one of address leads 0AD00 through 0AD15 is connected from the bus pick-off transformer circuit of FIG. 21 to the address pulse stretchers of FIGS. 14, 15, and 16.

(*b*) *Address pulse stretcher circuits* (*FIGS. 14, 15, 16*).—The 24 volt positive battery that was applied to lead 13E0 is provided with a current path through a primary winding of a "0" controller address pulse stretcher input transformer, such as transformer 14T1. An address pulse stretcher is shown detailed in FIG. 14. Lead 13E0 is connected to the upper primary winding of transformer 14T1 in series with diode 14CR1 and resistor 14R5 to address lead 0AD00. Resistor 14R5 in this path provides for current limiting. Address lead 0AD00 is returned to the collector of a transistor 21Q– in the bus pick-off transformer circuit (FIG. 21). The emitter and base of transistor 21Q– are connected across the fifty-turn secondary winding of address pick-off transformer 21T3 and receipt of an address bit by this transformer turns on transistor 21Q– to apply a 0.5 microsecond ground to lead 0AD00. The address lead pair feeding the primary windings of transformer 21T3 are connected to primary windings of pick-off transformers for peripheral units on other frames, as indicated in FIG. 22. At the last peripheral unit the address lead pair is terminated in its characteristic impedance.

The address pulse transmitted over the address lead pair associated with lead 0AD00, by gating-on the transistor 21Q–, provides a current path through the upper primary winding of transformer 14T1 of the address pulse stretcher. The current pulse applied to the upper primary winding of transformer 14T1 induces a current pulse in the secondary winding which forward biases diode 14CR2 and charges capacitor 14C1. Transistor 14Q1 is turned on during the first oscillatory discharge of capacitor 14C1 through inductor 14L1, etc., in similar manner to that described above for capacitor 13C2, inductor 13L1, and transistor 13Q3 of the enable-verify circuit. The values of capacitor 14C1 and inductor 14L1 are chosen so that the first oscillatory discharge persists for approximately 3.8 microseconds following the receipt of the 0.5 microsecond address pulse. The collector of transistor 14Q1 receives battery in series with the primary winding of transformer 14T2 and resistor 14R1–1 of the current regulator enable circuit (at the left of the address pulse stretchers).

In the address pulse stretcher, the initial discharge of capacitor 14C1 through inductor 14L1 is a half sinusoidal pulse of 3.8 microseconds duration. This half sinusoidal pulse turns on transistor 14Q1 and provides a half sinusoidal current pulse through the primary winding of transformer 14T1–1 of the current regulator circuit and through the primary winding of transformer 14T2 of the address pulse stretcher circuit. The sinusoidal pulse in the primary of transformer 14T2 causes a current pulse to be induced in its secondary winding which turns on transistor 14Q2 for substantially the entire 3.8 microsecond interval.

Figure 4:
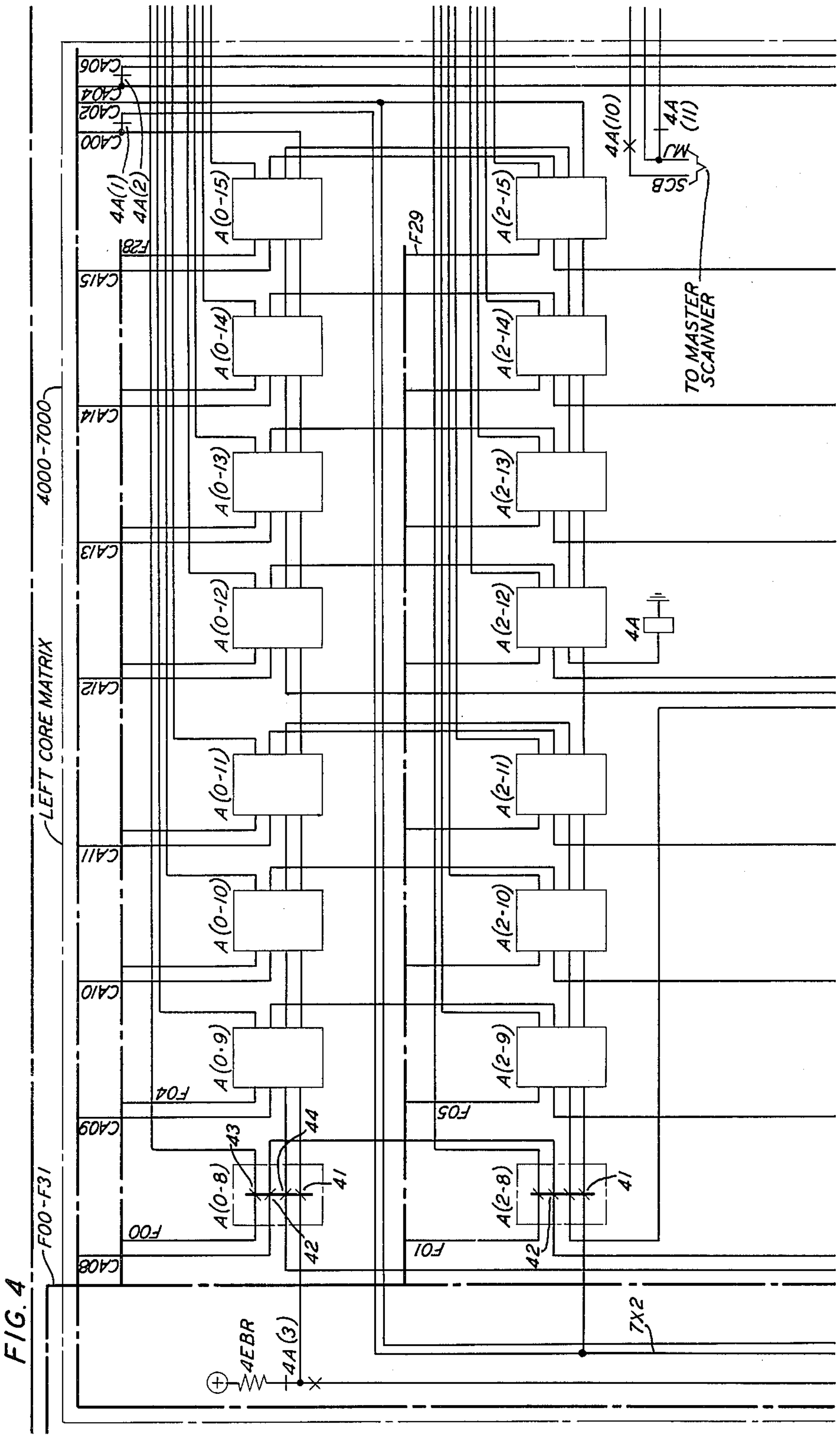
FIGS. 4 and 7 show the magnetic core access switch matrix of the "0" controller.
Figure 5:
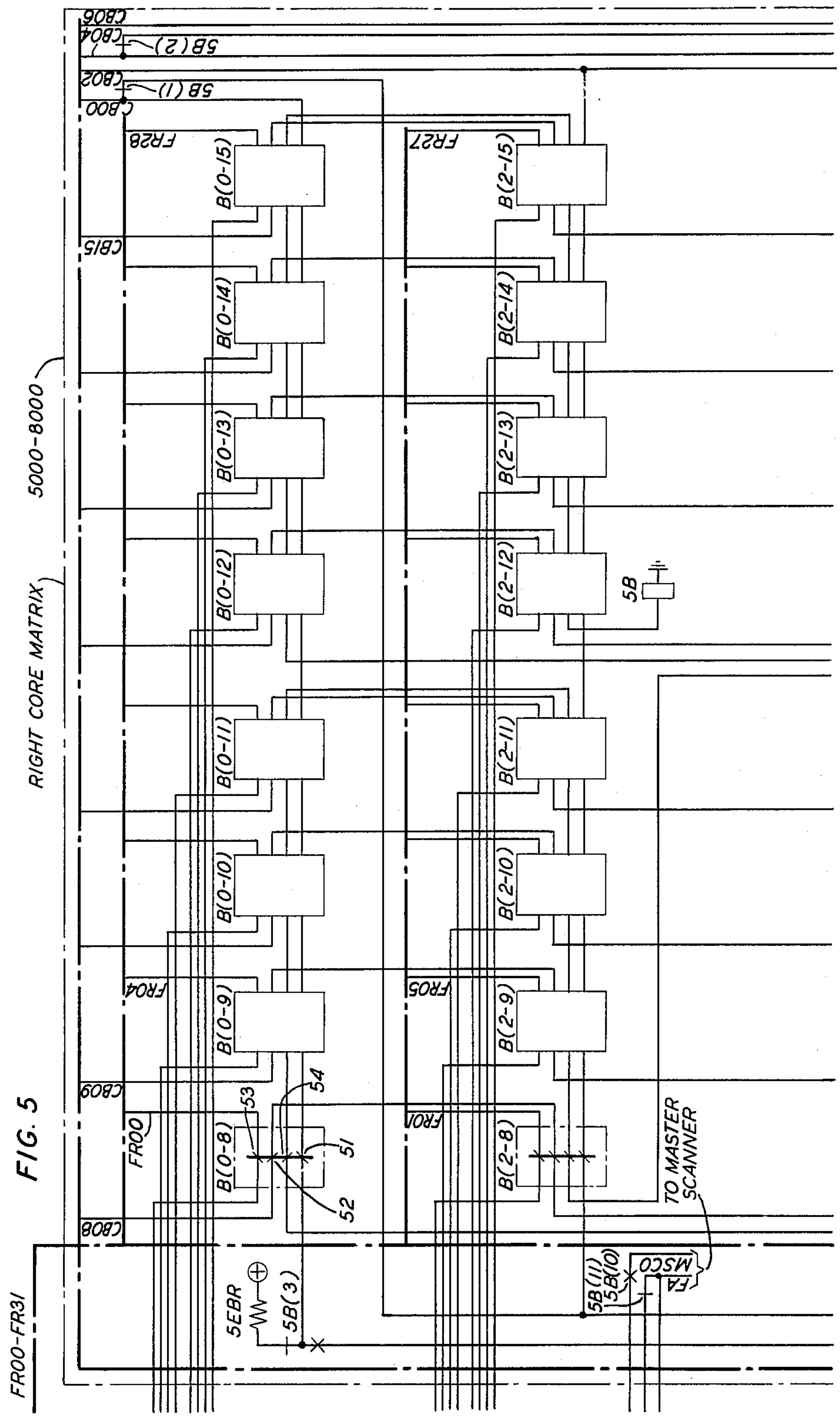
FIGS. 5 and 8 show the magnetic core access switch matrix of the "1" controller.

The 3.8 microsecond pulse at the collector of transistor 14Q1 is applied to the primary winding of transformer 14T2 and is coupled by the secondary winding of that transformer to turn on transistor 14Q2 for substantially the entire 3.8 microsecond interval. Transistor 14Q2 in the ON condition applies a low impedance ground through its emitter-collector junction to lead CA00. Lead CA00 is connected to a loop which includes the row drive windings 41 of eight magnetic cores in the upper row of the left-hand core matrix (FIG. 4). This loop continues through make contact 4A(3) to diode 7CRX0. The anode of diode 7CRX0 is connected to lead XAP and lead XAP is connected to the row drive regulator of FIG. 13 at the junction of diode 13CR8 and resistor 13R15. In similar manner, any of leads CA02, CA04, and CA06 could have been grounded to designate any other of the rows of the left core matrix. The address leads 0AD08 through 0AD15 or 1AD08 through 1AD15 control an address pulse stretcher of FIG. 15 to apply a column ground signal to one of leads CA08 through CA15.

In addition to the address pluse stretchers associated with leads 0AD00–0AD15 and 1AD00–1AD15, there is an address pluse stretcher in FIG. 15 associated with leads 0AD16 and 1AD16 of the peripheral communications bus. This address pulse stetcher is essentially similar to the address pulse stretcher detailed in FIG. 14 except that no connection is made to the input transformer of the current regulator enable circuit. The address pulse stetcher of FIG. 15 is used for maintenance test purposes to apply a 3.0 microsecond ground to lead TA when either of leads 0AD16 or 1AD16 is energized. The connection to the current regulator enable circuit is not necessary inasmuch as the selection of the maintenance test circuit address pulse stretcher of FIG. 15 obviates the need for enabling the current regulator circuit, i.e., under maintenance test conditions the magnetic core matrix circuit is not activated.

(*c*) *Core drive circuits* (*FIG. 13*) *and current regulator enable circuit* (*FIG. 14*).—The primary winding of transformer 14T1-1 of the current regulator enable circuit is energized by the 3.8 microsecond ground pulse provided by transistor 14Q1 of the address pulse stretcher being turned on. The 3.8 microsecond pulse is differentiated by transformer 14T1–1 and the shunting inductor 14L1–2 so that transistor 14Q1–1 is turned on only during the relatively short time the inductor presents a high impedance. When transistor 14Q1–1 is turned on, the lower end of the left-hand winding of transformer 14T2–2 is grounded through the low emitter-collector impedance of the transistor. A positive current pulse is induced at the dotted end of the secondary winding of transformer 14T2–2. The positive current pulse provided charges capacitor 14C2–2 through diode 14CR1–1 approximately 0.5 microsecond from the onset of the 3.8 microsecond ground pulse.

The values of capacitor 14C2–2 and inductor 14L1–1 are chosen so that the duration of the first oscillatory discharge of capacitor 14C2–2 through inductor 14L1–1 and the base-emittter junction of transistor 14Q2–2 persists for approximately 3.0 microseconds. The 3.0 microsecond pulse turns on transistor 14Q2–2 which grounds lead AIR by shunting battery feed resistor 14R7. Accordingly, transistor 14Q2–2 will turn off somewhat before the termination of the 3.8 microsecond pulse from the address pulse stretcher.

The 3.0 microsecond ground provided to the AIR lead allows a current pulse to flow through the primary winding of core drive transformer 13T3 (FIG. 13) in series with diode 13CR5. A positive voltage is induced at the dotted ends of the secondary windings of transformer 13T3, back-biasing diodes 13CR6 and 13CR7. The back-biasing of these diodes removes the center-tap ground shunting down the circuits for forward-biasing the base-emitter junctions of transistors 13Q6 and 13Q7. The potential at the junction of diodes 13CR6 and 13CR6' and at the junction of 13CR7 and 13CR7' rises sufficiently to turn on transistors 13Q6 and 13Q7. Transistor 13Q6, in going on, applies a current pulse to the primary of transformer 13T4 and transistor 13Q7 similarly pulses the primary of transformer 13T5. (Since the pulses induced at the secondary of transformers 13T4 and 13T5 activate identical drive current regulator circuits, only that regulator circuit connected to the secondary of 13T4 is hereinafter described.) The positive voltage appearing at the dotted secondary winding breaks down Zener diode 13CR11 establishing a constant voltage between the base of transistor 13Q8 and the junction of diode 13CR8 with resistor 13R22. This constant voltage causes transistor 13Q8 to provide a constant current through resistor 13R22 and diode 13CR8 to lead XAP which provides regulated half-select currents to the row drive windings of the core matrix. Similarly, lead YAP provides regulated half-select current to the column drive windings of the core matrix.

Inductor 13L6 is provided as a failure safeguard to blow a fuse in the power distributor 1601 (FIG. 16) supplying collector battery to transistor 13Q8 should this transistor develop a permanent emitter-collector short. Inductor 13L6 exhibits a high pulse impedance and does not appreciably shunt the normal current pulse provided by transistor 13Q8. If a short circuit condition should develop in transistor 13Q8, however, inductor 13L6 after a time provides a low impedance direct current path, allowing sufficient current to flow to blow the power supply fuse.

Figure 7:
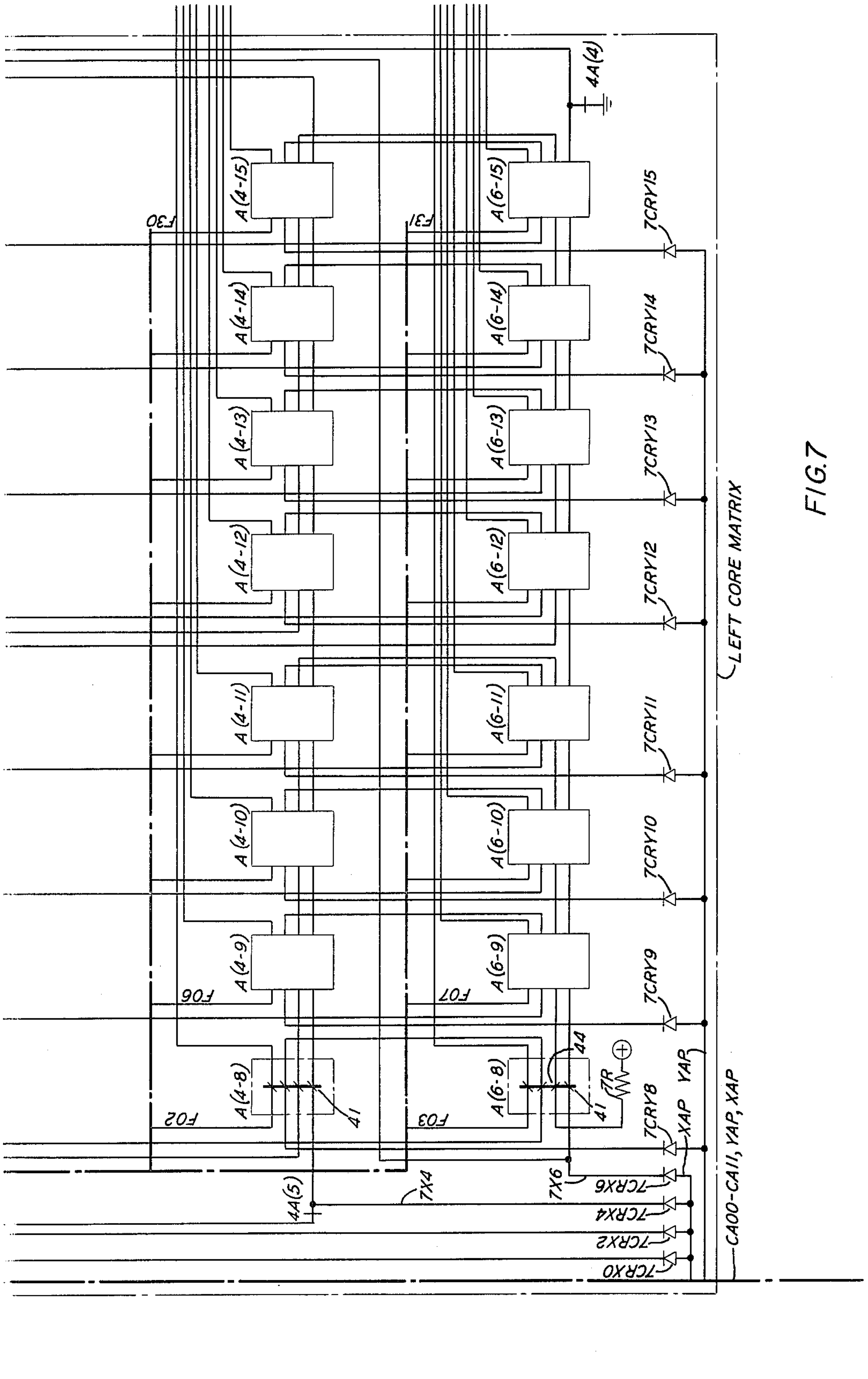
Figure 8:
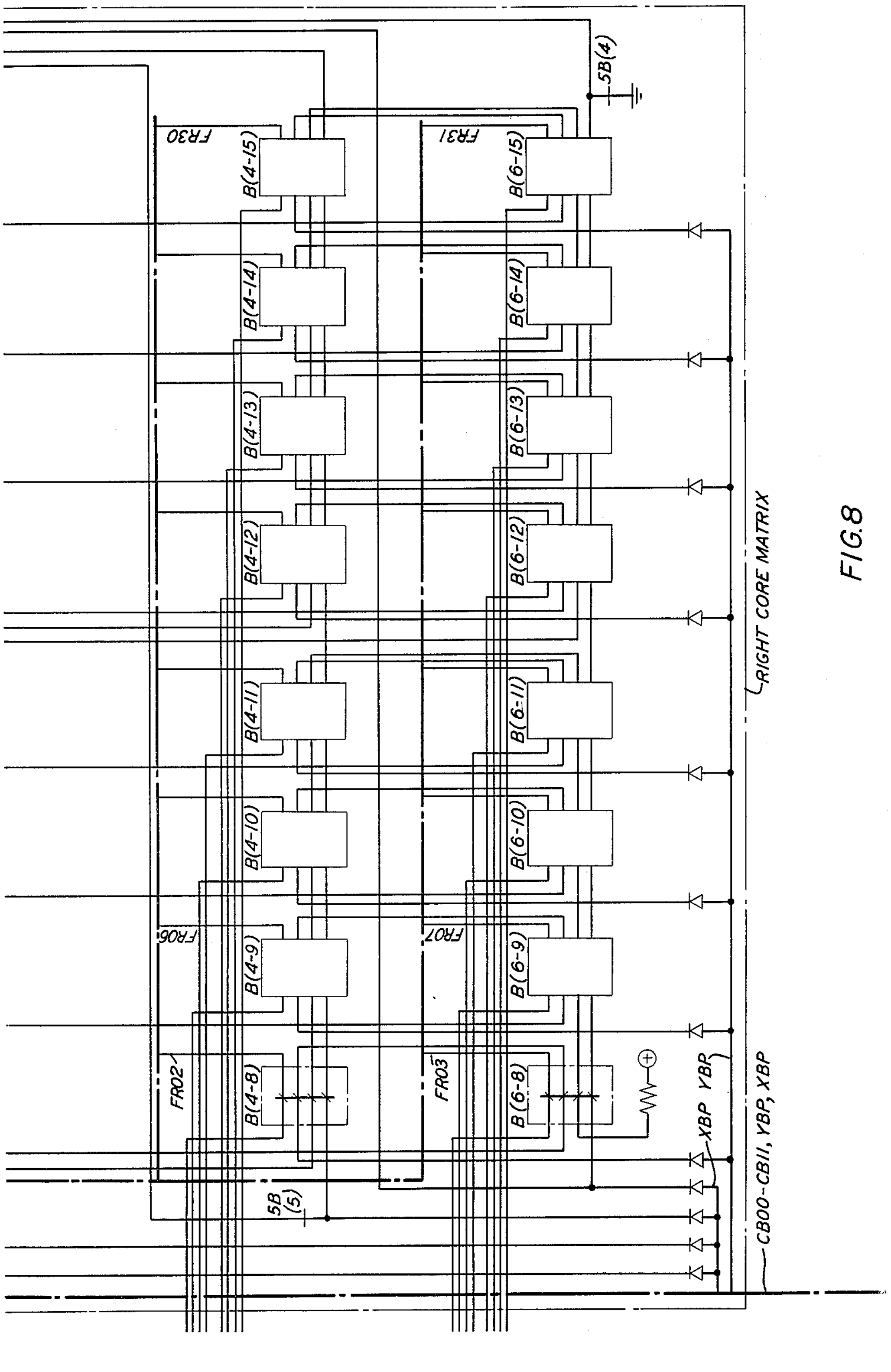

(*d*) *Coincident current magnetic core access switch matrices 4000–7000 and 5000–8000* (*FIGS. 4, 5, 7, 8*).—The coincident current magnetic core access switch matrices are shown in FIGS. 4, 5, 7, and 8. The left or "0" core matrix of FIGS. 4 and 7 is addressed by one of the address pulse stretchers of FIG. 14 applying 3.8 microsecond ground to one of row select leads CA00, CA02, CA04, or CA06. Simultaneously, one of the address pulse stretchers of FIG. 15 applies 3.8 microsecond ground to one of leads CA08 through CA15 to designate a particular column of cores in the matrix. The row drive regulator of FIG. 13 applies battery to lead XAP through one of diodes 7CRX0, 7CRX2, 7CRX4, or 7CRX6 and the column drive regulator circuit of FIG. 13 applies battery to lead YAP through one of diodes 7CRY8–7CRY15. The row and column select currents are each of half-select magnitude so that only the core having both row and column select current applied to its respective row select winding 41 and column select winding 42 will be switched.

In order that the regulated battery pulse on leads XAP and YAP will lie within the time of application of the 3.8 microsecond stretched address ground pulse on any of leads CA00–CA15, the 3.0 microsecond ground pulse on lead AIR (which enables the column and row drive regulator circuits of FIG. 13) is delayed approximately 0.5 microsecond from the onset of the 3.8 microsecond stretched address ground pulse.

Prior to the application of the row and column drive half-select currents, a reference magnetization state is established in the cores of the matrix by a bias current in the bias loop comprising the serially-connected biasing windings 44. The bias loop includes the winding of serially-connected bias monitoring relay 4A. The coincident half-select currents switch the magnetization state of a designated core in the matrix. At the termination of the coincident row and column current pulses, the bias current returns the selected core to its original condition.

Assuming core A(0–8) to have been switched (by the addressing of row ground lead CA00 and column ground lead CA08) an output current is induced in winding 43 of core A(0–8). Winding 43, at its left-hand side, is connected to lead F00 and, at its right-hand side, is connected to winding 53 of core B(0–8) in core matrix 5000–8000. The right-hand side of winding 53 is connected to lead FR00. Leads F00 and FR00 comprise an interrogate loop for applying bipolar interrogate currents to the aperture-threading interrogate conductors of a row of ferrods in ferrod matrix 2000–6000. This interrogate loop starting at lead F00 includes (FIG. 2) the interrogate conductor 2006 of ferrods 0001, 0003, intervening odd-numbered ferrods of the top row of the ferrod matrix, the interrogate conductor of ferrod 0015, to lead H00. Lead H00 is connected to one end of the primary winding of transformer 6ASWT–0 (FIG. 6). The other end of the primary winding of transformer 6ASWT–0 is connected to lead HR00. Lead HR00 is connected to the interrogate conductor 2006 of ferrod 0014. The interrogate loop may then further be traced through the interrogate conductors of intervening even-numbered ferrods of the top row of ferrod matrix 2000–6000, and the interrogate conductors of ferrods 0002 and 0000 to lead FR00.

The coincident half-select currents applied to core A(0–8) of core matrix 4000–7000 apply magnetomotive forces to this core which, according to the mirror symbolism employed, provide an "upward" switching flux. This switching flux causes lead F00 to become positive with respect to lead FR00. At the termination of the coincident half-select currents, the bias current applies a restoring "downward" switching flux. This flux switching reverses the polarity of leads F00 and FR00. When lead F00 is positive with respect to lead FR00, the interrogate current in winding 53 of core B(0–8) produces a flux in the same direction as that produced by the bias current in winding 54. Accordingly, winding 53 exhibits low impedance at this time since the remanent flux of core B(0–8) is not switched. When lead F00 is negative with respect to lead FR00, the direction of flux produced by the interrogate current in winding 53, although opposite to that of the bias flux, is insufficient to overcome the effect of the bias current in winding 54. Since the remanent state of core B(0–8) is not switched, winding 53 continues to exhibit low impedance to the interrogate pulse produced in interrogate loop F00–FR00 by the switching of core A(0–8).

The biasing circuit for the cores of the left or "0" magnetic core matrix, accordingly is seen to cooperate with the biasing circuit for the cores of the right or "1" core matrix, and vice versa, so as to provide restorative switching of the core of the coincidentally addressed matrix and to prevent switching of the companion core in the other matrix. In this manner the necessary bipolar pulses for interrogating the ferrod matrix are provided, which bipolar pulses permit the ferrod stick to be fabricated of high performance, square-loop materials.

It will be noted that the winding of relay 4A is inserted in the biasing loop of the left-hand core matrix and the winding of relay 5B is inserted in the biasing loop including all the biasing windings of the cores of the right-hand core matrix. Relays 4A and 5B are normally operated so long as bias current is maintained. Relay 4A operated, at its back contact 4A(1), maintains leads CA00 and 7X2 separated from each other, and operated back contact 4A(2) maintains leads CA04 and 7X6 separated from each other so that any of the four rows of core matrix 4000–7000 may be individually addressed for coincident current selection.

Should, for any reason, the continuity of the biasing loop, including the winding of relay 4A, be interrupted, relay 4A will release and the isolation between the aforementioned leads will be overcome by the release of back contacts 4A(1) and 4A(2). The effect of the release of these back contacts is to provide an alternative serial path including a winding 41 of each core of core matrix 4000–7000. One end of this loop is connected to emergency resistance battery through back contact 4(A)3 and the other end is connected to ground through back contact 4A(4), FIG. 7. Back contact 4A(5), FIG. 7, serially connects together leads CA02 and 7X4 of core matrix 4000–7000 to complete the serial path. Similar remarks apply to the contacts of bias monitoring relay 5B of core matrix 5000–8000 shown in FIGS. 5 and 8. Provision of the emergency bias circuit in the event of the failure of the normal bias assures that when the matrix of the still-operable controller is selected, the output windings of the cores of the defective matrix will be maintained in the low impedance condition. It should be noted that conventional wire spring relays may advantageously be employed for bias monitoring because the windings of these relays exhibit a high pulse impedance in the biasing loop. This high pulse impedance of the bias monitoring relay prevents the normal biasing loop from acting as a short circuited turn on the cores. Accordingly, the current for interrogating the ferrod matrix is not attenuated by the inducing of circulating currents in the biasing loop.

2. *Ferrod matrix 2000–6000 (FIGS. 2, 3, 6)*

The ferrods in matrix 2000–6000 are arranged in rows and columns so that there are sixteen ferrods in a row and as many rows (thirty-two rows being schematically illustrated) as are required to provide sufficient ferrods to monitor the desired number of external circuits. Each of the external circuits (not shown) that are monitored is connected to the control windings 2001, 2002 of a respective ferrod. A monitored loop start circuit, for example, that may be connected to ferrod control windings completes a circuit path from a TS– to an RS– lead allowing current to flow through the ferrod control windings 2001, 2002 when the loop start circuit is in the active or off-hook condition. Current in the control windings longitudinally saturates the ferrod stick. When a ground start line is desired to be monitored, ferrod control windings 2001 and 2002 would serially be connected together (not shown) at the ferrod matrix and only lead RS– would be brought out as the ground start line. The monitored ground start circuit would, in the active state, ground lead RS– to energize the ferrod control windings.

A row of ferrods is interrogated by the left core matrix 4000–7000 or by the right core matrix 5000–8000 applying a bipolar current pulse to one of interrogate loops F00–FR00 through F31–FR31, there being thirty-two rows of ferrods and hence thirty-two interrogate loops in the illustrated ferrod matrix. The interrogate loop conductors, such as conductors F00 and FR00 of the first row, are connected to the interrogate conductors 2006 of the ferrods in the row in such a manner as to reduce loop inductance and eliminate unnecessary terminals. Accordingly, conductor F00 is connected to the interrogate conductor 2006 of odd-numbered ferrod 0001. This interrogate conductor is connected to the interrogate conductor of the next odd-numbered ferrod, and so on, to lead H00. Conductor FR00 at the other end of the interrogate loop is connected to interrogate conductor 2006 of the first even-numbered ferrod 0000. This interrogate conductor is connected to the interrogate conductor of the next even-numbered ferrod, and so on, to lead HR00. The interrogate loop is completed by the primary winding of transformer 6ASWT–0 in FIG. 6 which primary winding is connected between leads H00 and HR00. Whenever an interrogate pulse is applied to interrogate a row of ferrods, the interrogate current must therefore flow through the primary winding of an associated 6ASWT– transformer.

The state of the external circuit monitored by the ferrod is ascertained (when the ferrod is interrogated) by the presence or absence of a pulse induced in one of sixteen readout loops R00–RR00 through R15–RR15. Since an interrogate pulse is applied to sixteen ferrods in a row, the pulses induced in the sixteen readout loops reflect the condition of the sixteen associated monitored circuits. The secondary winding of one of maintenance test transformers 6MT0 through 6MT15 is connected in series with each of the readout loops. During normal monitoring of external circuits this winding merely provides a conductive low impedance path for readout currents. When maintenance tests are performed a signal is introduced into each of readout loops R00–RR00 through R15–RR15 by the respective maintenance test transformer regardless of the state of the circuits connected to the ferrod control windings.

A readout loop may be traced beginning, in FIG. 3, at lead RR00 and readout conductor 2008 of ferrod 3000, through the readout conductors of the even-numbered ferrods of the twenty-eight intervening rows between FIGS. 3 and 2, to the readout conductors of ferrods 0000 and 0100 of FIG. 2, thence back through the readout conductors of the odd-numbered ferrods of the twenty-eight intervening rows between FIGS. 2 and 3, to the readout conductor of ferrod 3100. The readout conductor 2008 of ferrod 3100 is connected to one end of transformer 6MT0 and the other end of the secondary winding is connected to lead R00. As was the case of the interrogate loops, the readout loops are also connected to reduce loop inductance and to eliminate unnecessary terminals.

Figure 9:
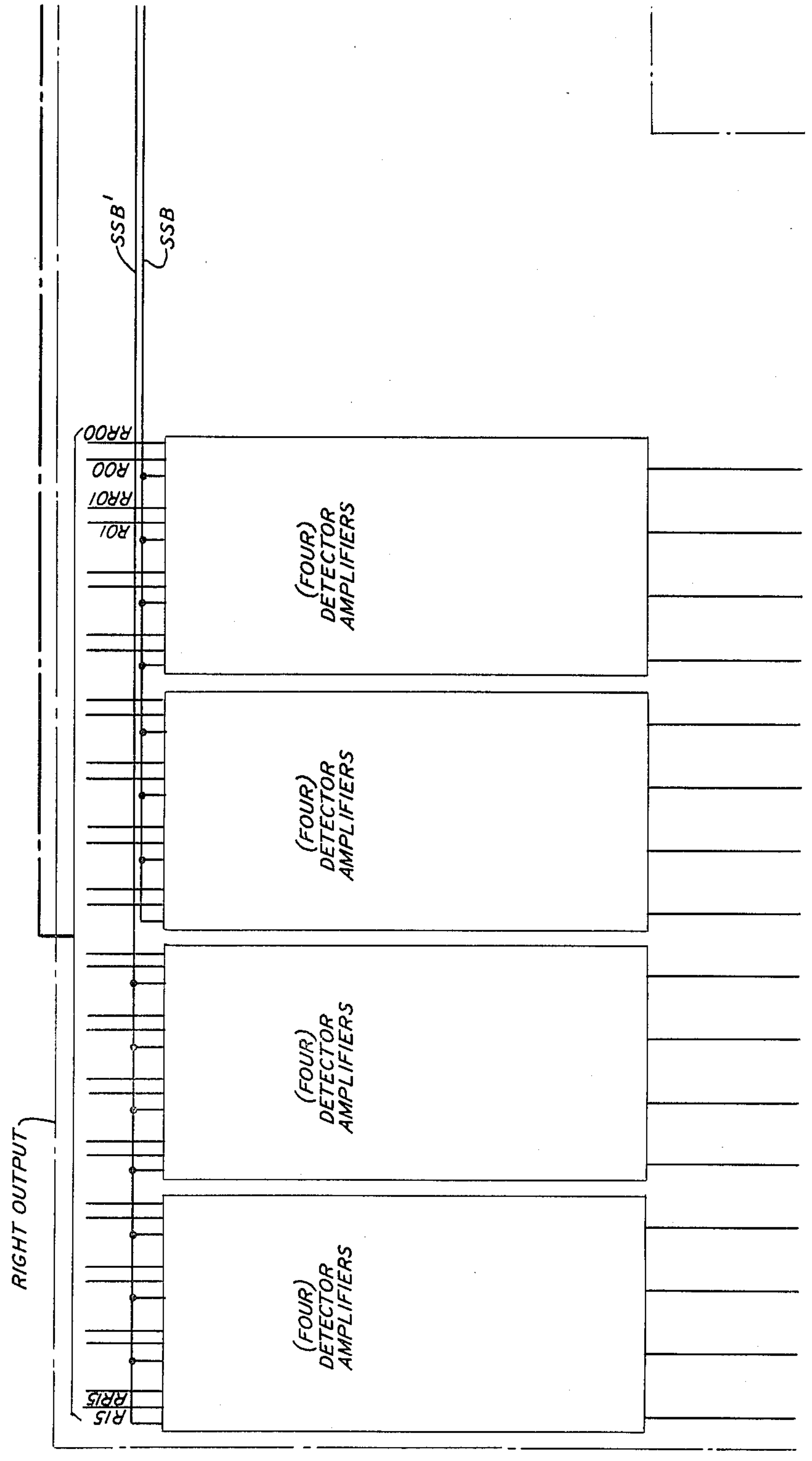
FIGS. 9 and 12 show the output detector amplifiers of the "1" and "0" controllers, respectively.

The continuity of the readout loop between leads R00 and RR00 is completed by the primary winding of a detector amplifier transformer in both the left output circuit (FIG. 12) and the right output circuit (FIG. 9). For example, continuity between leads R00 and RR00 is completed by the primary winding of detector amplifier transformer 12T1 of the left output circuit, which primary winding is paralleled by primary winding of the detector amplifier transformer (not shown in detail) of the right output circuit in FIG. 9.

While heretofore the description has been concerned with a line scanner, a scanner called a master scanner substantially identical to the one depicted is employed to monitor certain control points in the scanners that are used to monitor the condition of lines, trunks, and junctors. The relevant control points of these scanners, such as leads SCB and MSC0 (FIGS. 4, 5), are connected to the control windings of a ferrod in this master scanner, and the master scanner furnishes to central control information as to the status of these control points in the same manner as the line scanner furnishes its information concerning the monitored lines.

The differences in connections required at the ferrod control windings 2001, 2002 and monitoring loop start and ground start lines have been noted above. For monitoring other circuits the battery and ground shown as being supplied within the ferrod matrix may be externally supplied, and, in fact, the characteristics of the ferrods comprising the matrix may be as varied as the individual circuits desired to be monitored.

The biasing arrangement of the ferrod matrix having been generally described in connection with the description of FIG. 1 need not be repeated here.

3. *ASW–S output circuits 1800 and 1900 (FIGS. 18, 19) and current level detector circuits (FIG. 14)*

Each time a row of ferrods of ferrod matrix 2000–6000 is interrogated a pulse should be induced in the secondary winding of the 6ASWT– transformer that is serially connected in the interrogate loop for that row regardless of the state of the circuits monitored by the ferrods of that row.

For example, one of the interrogate loops may be traced in FIG. 1, beginning with lead F00, through interrogate conductors of ferrods 0001, 0003, the intervening odd-numbered ferrods to ferrod 0015, and lead H00 which lead is connected to the dotted end of transformer 6ASWT–0. The undotted end of this transformer is returned via lead HR00 to the interrogate conductor of ferrod 0014 which, in turn, is connected to the interrogate conductors of the intervening even-numbered ferrods to the interrogate conductors of ferrods 02 and 00 and lead FR00.

The interrogate current is of approximately one ampere peak to peak, is substantially sinusoidal in shape, and is of approximately 7.0 microseconds duration. The sinusoidal interrogate current applied to the 6ASWT– transformers induces a current pulse in the secondary windings thereof, and leads G00 through G31 connected thereto, which indicates that an interrogate current has been provided to a row of sixteen ferrods. Leads G00 through G31 are connected to the left or "0" ASW–S output circuit of FIG. 19 and to the right or "1" ASW–S output circuit of FIG. 18.

The 7.0 microsecond interrogate current which flows through the primary winding of any of transformers 6ASWT– is differentiated by the respective transformers and appears at the secondary windings thereof as a current pulse of one polarity at the beginning of the 7.0 microsecond interval and a pulse of opposite polarity at the beginning of the 3.5 microsecond negative going interval. Advantageously, however, the ASW–S output circuits utilize only the first of these pulses.

Assuming that lead G00 is made positive on the first of these current pulses, diode 19CR0 of the left or "0" ASW–S output circuit will be forward-biased and raise the potential of common point 190R. A corresponding diode 18CR0 of the right or "1" ASW–S circuit is also forward biased and similarly raises the potential of common point 180R. A corresponding one of diodes 18CR00–18CR31 and 19CR00–19CR31 is in series with each of leads G00 through G31 at each of the right and left ASW–S output circuits, respectively.

The pulse developed in any of the 6ASWT– transformers is allowed to raise the potential of the respective common points 190R and 180R provided that grounds are not made available at the cathodes of any of diodes 19CR2, 19CR4 or of diodes 18CR2, 18CR4, respectively. No ground will be provided at the cathodes of diodes 19CR4 and 18CR4 if the core matrix has been correctly addressed and no ground will be provided at diodes 19CR2 and 18CR2 if a maintenance test order (hereafter to be more fully described) has not been received at the address pulse stretchers. Since both the ASW–S output circuits are similar, only the left ASW–S output circuit of FIG. 19 will be described in detail.

Two diodes 19CR1 are used in the ASW–S output circuits to insure that sufficient voltage appears between point 190R and ground so that transistor 19Q1 will not inadvertently be turned on by partial addressing of a ferrod interrogate loop. Each of the diodes 19CR1 advantageously is of a silicon type and requires approximately 0.4 volt forward bias in order to break down. In the conducting state the voltage drop across each diode increases to approximately 0.6 volt, thereby requiring a voltage in excess of 1.2 volts plus the forward voltage drop across the base-emitter junction of transistor 19Q1, for example, to be provided to maintain transistor 19Q1 turned on. Transistor 19Q1, being turned on, provides a low impedance return to ground for the undotted end of the primary winding of transformer 19T1. Ground is maintained at the undotted end of this transformer for approximately 1.5 microseconds. This interval occurs during the positive-going current pulse induced in the secondary winding of transformer 6ASWT– at the beginning of the 7.0 microsecond interrogate current pulse in the ferrod loop.

The dotted end of the primary of transformer 19T1 is connected to lead SSA. A positive strobe pulse which is approximately 0.5 microsecond in duration and delayed approximately 1.4 microseconds from the onset of the appearance of the 3.0 microsecond ground pulse on lead AIR is applied to lead SSA by the delay and pulse shaper of FIG. 11. This 0.5 microsecond pulse is coupled through diode 19CR3 at the secondary of transformer 19T1 to turn on transistor 19Q2 which grounds lead 0AN16. The pulse at the secondary of transformer 19T1 also turns on transistor 18Q2 even though a strobe pulse is not applied on lead SSB of the right or "1" ASW–S output circuit (FIG. 18). Transistor 18Q2, being turned on, grounds lead 1AN16. Lead 1AN16 is associated with the primary of an answer-back transformer whose secondary is connected across the "1" answer lead pair to central control. Similarly, lead 0AN16 is connected to the primary of an answer-back transformer whose secondary is connected across the "0" answer lead pair to central control. The absence of signals on either answer lead pair enables the central control to determine that the addressed controller should be either re-addressed or the standby controller selected.

Before the potential at one of the common points 190R and 180R can be raised by the pulse developed in the 6ASWT– transformer to operate its respective ASW–S output circuit (and thereby inform central control that the ferrod matrix has successfully been interrogated) a check is made that not more than one row of ferrods of the ferrod matrix has been so interrogated. As described above, the particular row of ferrods which is interrogated is determined by either of core matrices 4000–7000 or 5000–8000 being supplied a single row and a single column address. This single row address causes the address pulse stretchers to ground only one of leads CA00, CA02, CA04, CA06, and the single column address causes the address pulse stretchers to ground only one of leads CA08 through CA15. The current level detector circuits of FIG. 14 will ground lead UKIA if more than one row or more than one column of the core matrix is addressed and the ground on lead UKIA shunts down the resistance battery in the ASW–S output circuit and prevents the potential of point 190R being raised.

Referring now to the current level detecting circuit of FIG. 14, it is seen that the grounding of two or more of leads CA00 through CA06 enables a corresponding number of diodes 14CR00–14CR06. When lead PBL is pulsed a current pulse flows through the primary of transformer 14T5, and the two or more enabled diodes, that is sufficient to cause transformer 14T5 to turn on transistor 14Q5. Transistor 14Q5 is maintained nonconducting (emitter back-biased) until this time by the potential developed across common emitter resistor 14R14. This potential is provided by the current through normally-conducting transistor 14Q6. When only one of leads CA00–CA06 is grounded, the pulse provided by transformer 14T5 is insufficient to overcome the bias potential across resistor 14R14 and transistor 14Q5 is not turned on. However, if more than one of these leads is grounded, transistor 14Q5 is turned on causing transistor 14Q6 to be turned off. This raises the potential available through resistor 14R15 to the base of transistor 14Q7, turning it on. Transistor 14Q7, being turned on, grounds lead UKIA providing a low impedance ground to the cathode of diode 19CR4.

Battery is applied to lead PBL at the dotted end of the primary winding of the current level detector input transformer 14T5 from the current level strobe circuit of FIG. 13 only for a short interval of time, approximately 3.0 microseconds, commencing at the time that the current regulator enable circuit grounds the AIR lead, as described above. A battery pulse rather than a constant battery is applied to the primary winding of transformer 14T5 so that a short circuit condition in an address pulse stretcher output transistor, such as transistor 14Q2, will also cause the current level detector circuit to indicate. Had constant battery been used, transformer 14T5 would not respond to a steady state ground on any of leads CA00–CA06. Accordingly, a sufficient current pulse appears when the battery pulse is applied to lead PBL even if a permanent ground exists on any of leads CA00–CA06.

4. *Scanner answer output circuits 900–1700 and 1100–2000 (FIGS. 9, 10, 17, 11, 12, 20)*

Figure 10:
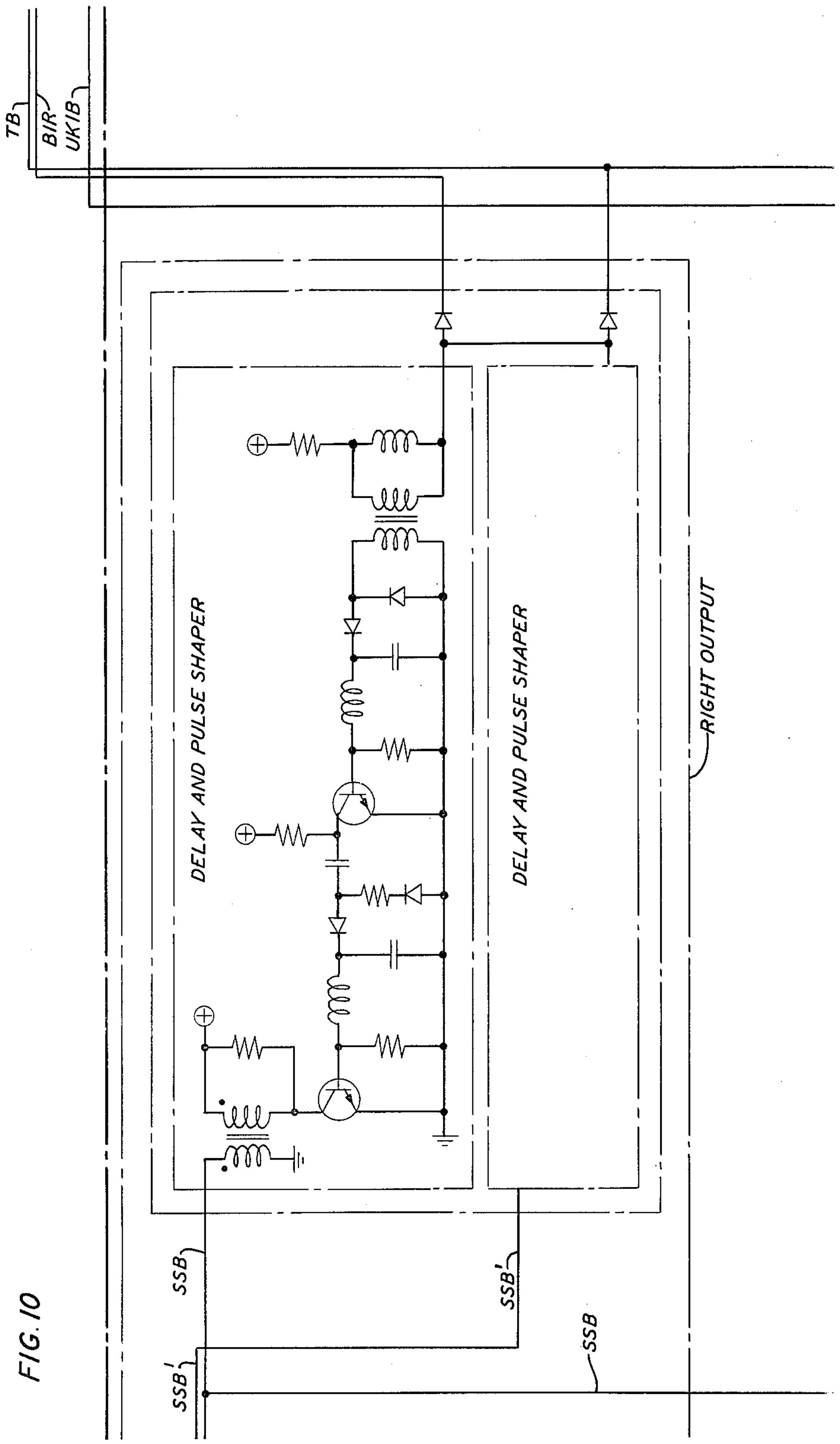
FIGS. 10 and 11 show the output pulse shaper of the "1" and "0" controllers, respectively.
Figure 11:
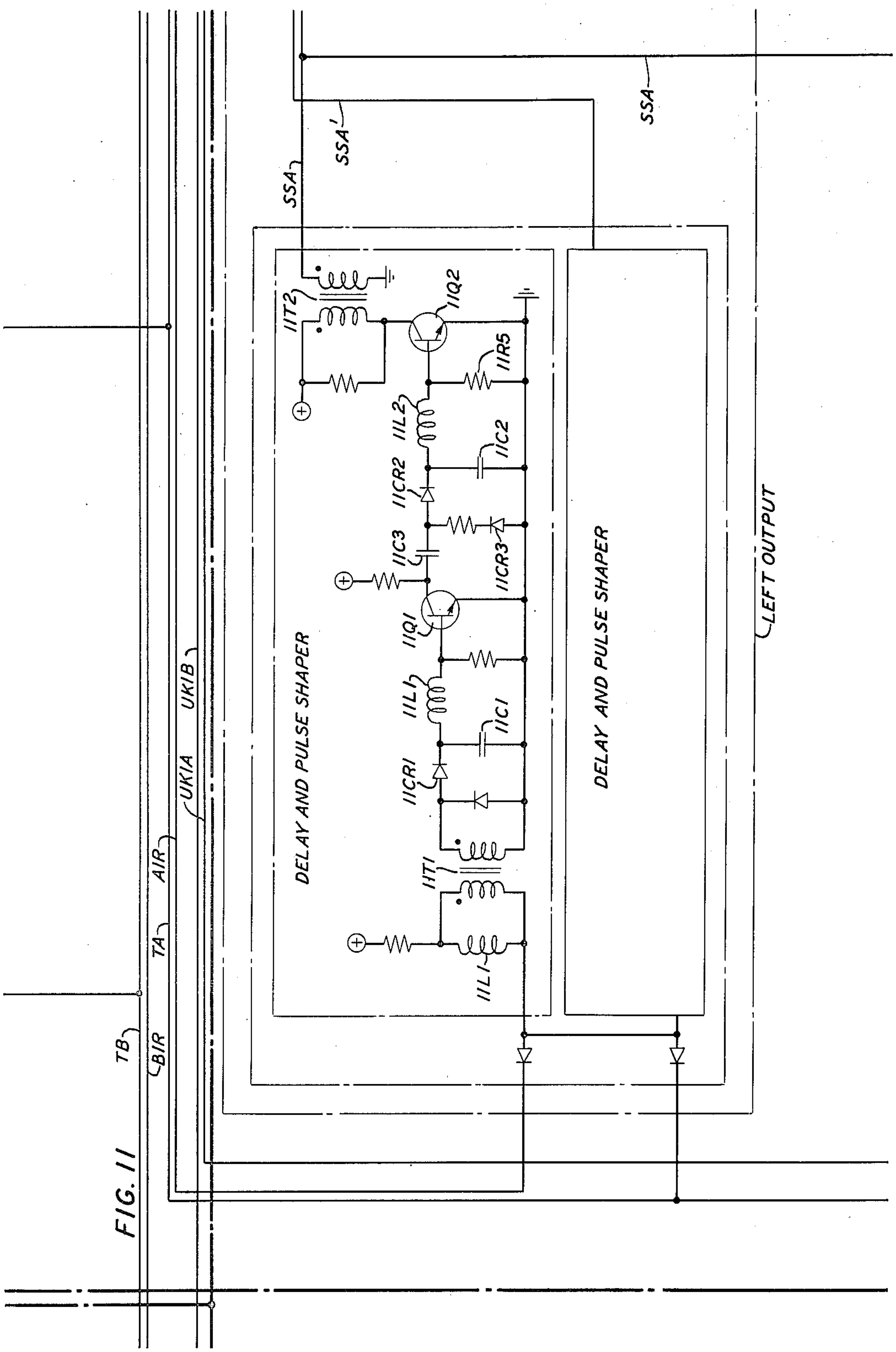
Figure 12:
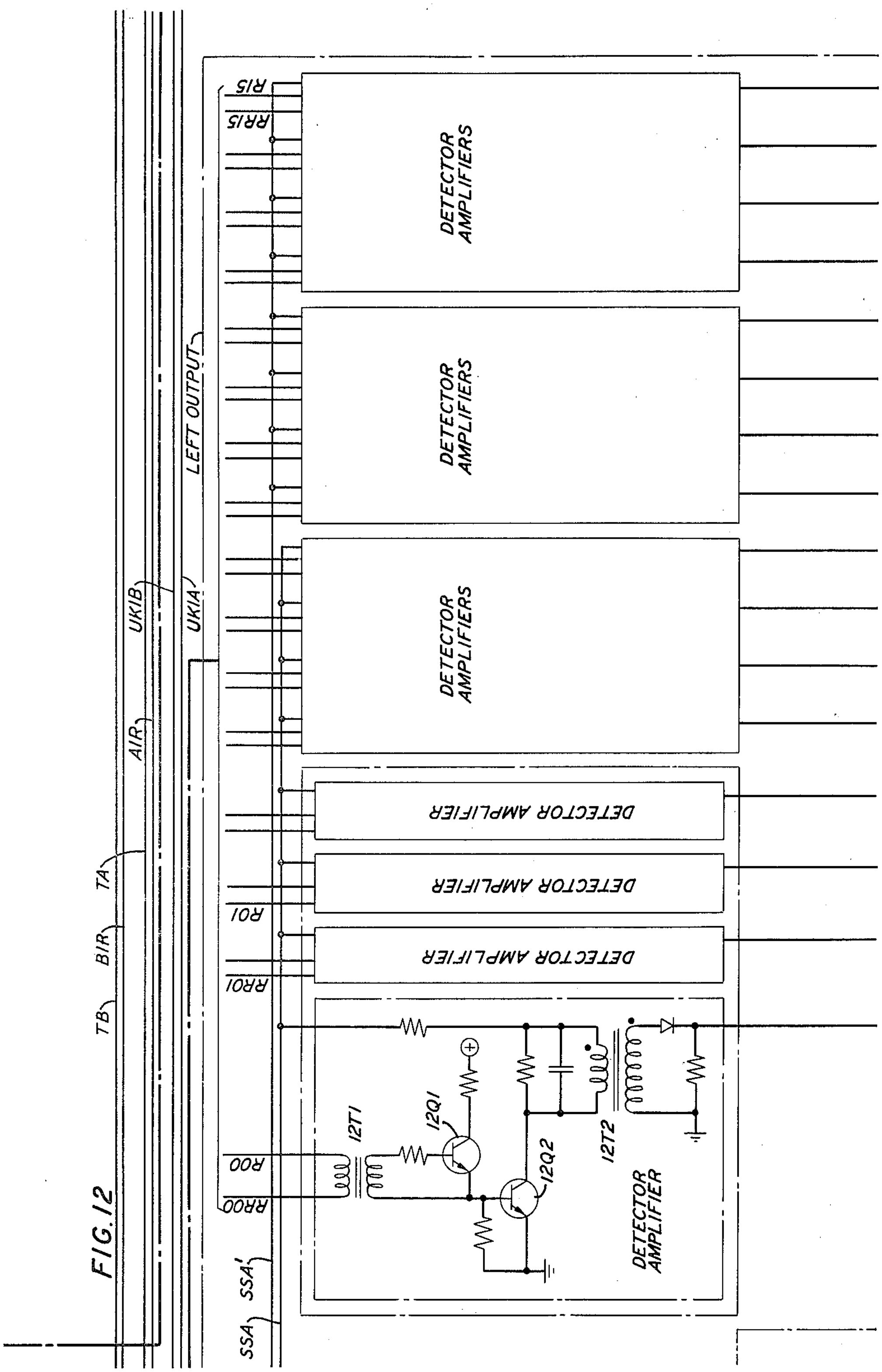

The sixteen detector amplifier circuits and the delay and pulse shaper circuits for gating these detector amplifiers of the left or "0" controller are shown in FIGS. 12 and 11, respectively. The detector amplifier and delay pulse shapers for the right or "1" controller are shown in FIGS. 9 and 10, respectively.

The delay and pulse shaper of FIG. 11 receives the pulse that is applied to the AIR lead by the current regulator enable circuit of FIG. 14. The 3.0 microsecond pulse on lead AIR is differentiated by the combination of inductor 11L1 and transformer 11T1 to provide a 0.5 microsecond positive current pulse at the dotted end of the secondary winding of transformer 11T1. Capacitor 11C1 charges through diode 11CR1 and discharges through inductor 11L1 and the base-emitter junction of transistor 11Q1 to turn transistor 11Q1 on for approximately 1.4 microseconds.

Prior to transistor 11Q1 being turned on, the upper plate of capacitor 11C2 is at ground potential, having been shunted by the low direct current impedance provided to ground through inductor 11L2 and resistor 11R5. Capacitor 11C3, prior to the turning on of transistor 11Q1, has been charged substantially to battery potential. When transistor 11Q1 is turned on, capacitor 11C3 is provided with a discharge path through the collector-emitter junction of transistor 11Q1, 11CR3, and resistor 11R4. When transistor 11Q1 turns off at the end of the 1.4 microsecond interval, capacitor 11C3 commences to charge again and applies a positive current pulse through diode 11CR2 to charge capacitor 11C2. Capacitor 11C2 is provided with an oscillatory discharge path through inductor 11L2 and the base emitter junction of transistor 11Q2. The values of capacitor 11C2 and inductor 11L2 are selected so that transistor 11Q2 is turned on for approximately a 0.5 microsecond interval following the turning off of transistor 11Q1. The turning on of transistor 11Q2 applies a 0.5 microsecond current pulse through the primary of transformer 11T2 and a positive 0.5 microsecond pulse is induced at the dotted end of the secondary winding connected to lead SSA. The turning on of transistor 11Q2 therefore provides a positive-going, 0.5 microsecond pulse to lead SSA approximately 1.4 microseconds from the onset of the 3.0 microsecond ground on lead AIR. Assuming for the sake of illustration that a readout pulse is applier to the primary winding of transformer 12T1 associated with leads RR00 and R00 of the readout loop previously traced, sufficient current is induced in its secondary winding to turn on transistor 12Q1. Transistor 12Q1, being turned on, provides resistance battery to the base of transistor 12Q2, turning the latter transistor on when lead SSA is pulsed. Transistor 12Q2, turning on, provides a low impedance ground to the undotted end of the primary winding of transformer 12T2. The dotted end of this transformer is connected to lead SSA and receives a 0.5 microsecond positive pulse. A positive-going pulse is induced in the secondary winding of transformer 12T2 which turns on the cable drivers of FIGS. 20 and 17 for the "0" and "1" scanner answer buses, respectively. The outputs of the cable drivers are coupled to the scanner answer buses via cable driver transformers in similar fashion to that described above for the ASW–S output circuits of FIGS. 18 and 19.

In this manner the central control receives answer information both on the "0" and "1" scanner answer buses. Although the parallel detector amplifier circuit of FIG. 9 also receives the read pulse from readout loop R00–RR00, this amplifier is not supplied a gating pulse on lead SSB and does not therefore operate its cable drivers in FIG. 17. Instead, the cable drivers of both FIGS. 17 and 20 are operated by the detector amplifiers of FIG. 12. In this manner failure in a component of either controller will not prevent answer signals from being applied to both scanner answer buses. It is deemed advantageous in the electronic switching concept to provide answers on both scanner answer buses even though one controller may be inoperative because this procedure provides a method for double checking the performance of central control and of the scanner answer bus system which checking would not be possible if the failure of one controller disabled a corresponding one of the scanner answer buses.

5. *Maintenance testing*

Under maintenance test condition the address pulse stretcher 1502 for the left controller (FIG. 15) may receive a 0.5 microsecond ground pulse from lead 1AD16 (responsive to the addressing of lead pair 1AD16P, 1AD16N of the "1" peripheral communications bus) or from lead 0AD16 (responsive to the addressing of lead pair 0AD16P, 0AD16N of the "0" peripheral communications bus). A corresponding battery pulse is applied to either lead 13E1 or lead 13E0 in accordance with whether enable lead pair EN00N, EN00P or enable lead pair EN01N, EN01P, is addressed by the central pulse distributor. (A similar address pulse stretcher is associated with lead TB of the right controller, FIG. 16.)

Whichever primary winding of transformer 15T1 is energized, a pulse is induced in the secondary winding of this transformer to charge capacitor 15C1. Capacitor 15C1 discharges through inductor 15L1 and the base emitter of transistor 15Q1 to turn on transistor 15Q1 for approximately 3.0 microseconds. Transistor 15Q1, being turned on, grounds lead TA for approximately 3.0 microseconds. The ground on lead TA provides a current path through the primary windings of transformer 6T1 of the left maintenance test amplifier 600 shown in FIG. 6.

The ground pulse on lead TA also is applied to the cathode of diode 19CR2 of the left ASW–S output circuit (FIG. 19) which prevents this circuit from providing central control the indication which this circuit would provide had central control erroneously sent a legitimate scanner address with the maintenance test order. The 3.0 microsecond ground pulse on lead TA operates the delay and pulse shaped circuits of FIG. 11 in similar manner to that in which these circuits were operated by the 3.0 microsecond ground applied to the AIR lead. (During maintenance testing no ground appears on the AIR lead inasmuch as no input is provided to the current regulator enable circuit from address pulse stretcher 1502.) When the delay and pulse shaper circuit of FIG. 11 is operated by the ground pulse appearing on lead TA, a 0.5 microsecond, positive-going pulse, delayed 1.4 microseconds from the onset of the TA lead ground, is applied to leads SSA and SSA'.

The application of the 3.0 microsecond ground on the TA lead causes the left maintenance test amplifier 600 to ground the right-hand end of the primary winding of transformer 6MT15. Battery is applied through diode 6CR1 to the left-hand end of the primary winding of transformer 6MT0. The primary windings of transformers 6MT0 through 6MT15 are connected in series. Each primary winding is shunted with a respective resistance of low value 6MR. This low resistance is required so that during normal readout, the secondary winding of each transformer will exhibit a low pulse impedance and thereby not unduly attenuate the normal readout signal from the ferrods. However, under maintenance test conditions these resistors 6MR do not interfere with the serial energization of the primary windings of transformers 6MT0 through 6MT15. Under maintenance test conditions the magnetic core matrices are not addressed and no interrogate pulses are applied by either of the matrices to the ferrod array. The pulses that are induced in the readout loops R00–RR00 through R15–RR15 are solely the function of the energization of the transformers 6MT0 through 6MT15. A readout pulse is induced in each of the sixteen readout loops causing each of the sixteen detector amplifiers of the left or "0" controller (which have been gated by the pulse on lead SSA) to respond. Had the maintenance test pulse stretcher of the right-hand controller (FIG. 16) been addressed, lead TB would have been grounded and would have enabled the delay and pulse shaper (FIG. 10) to enable the sixteen detector amplifiers (FIG. 9) of the right controller to respond.

The maintenance test sequence checks the proper operation of each of the ferrod readout loops and of the detector amplifiers of each controller. During normal monitoring of lines a pulse may or may not be induced in any of the readout loops and thus it would be impossible to determine whether the failure to receive a readout in any loop were due to the monitoring circuit being in the active state or to a detector amplifier malfunctioning. However, during maintenance testing failure to provide an output to any cable driver is indicative of readout loop-detector amplifier malfunction.

An additional check on the operation of the detector amplifiers is provided by the 0.5 microsecond duration, 1.4 microsecond-delayed positive-going pulse applied to the SSA and SSA′ leads when no ferrod row has been selected or when the maintenance test order has not been sent. It is conceivable that a short circuit condition in transistors 12Q1 or 12Q2, for example, would permit a detector amplifier in the "0" controller to operate the cable drivers of FIGS. 17 and 20 when the positive-going pulse is applied to the SSA and SSA′ leads even though there was no input on the R–, RR– leads. The short circuit condition of transistors 12Q1 and 12Q2 may be detected by central control sending a partial ferrod row address. This has the effect of generating a positive-going pulse on leads SSA and SSA′ while producing no R–, RR– inputs to the detector amplifiers. The enabling of any of the cable drivers under these conditions indicates the malfunctioning transistors.

It is to be understood that the above-described arrangements are merely illustrative of the application of the principles of the present invention; numerous other arrangements may be devised by those skilled in the art without departing from the spirit and scope of the invention.

What is claimed is:

1. A telephone supervisory system having a plurality of circuit monitoring devices and means for selectively interrogating said devices to indicate the condition of the circuits individually associated therewith, said interrogating means comprising a plurality of interrogating loops, each of said interrogating loops being coupled to a row of said plurality of monitoring devices, a first and second biased magnetic core coincident current access switching matrix, each said matrix having a plurality of output windings equal to the number of said interrogating loops, corresponding output windings of said first and second matrix being connected with each other in series with a respective one of said interrogating loops, and means controlled by the condition of the bias in each of said matrices respectively to restore a selectively switched access core in said first matrix and to inhibit the core corresponding to said selectively switched core in said second matrix.

2. A telephone supervisory system according to claim 1 wherein said bias condition controlled means of said second matrix comprises a bias sensing means and means controlled by said bias sensing means for providing a current-carrying path linking all the cores of said second matrix.

3. An electronic scanning system comprising first and second coincident current biased magnetic core switching matrices, the cores of said matrices each having row and column windings, a bias winding and an output winding, a plurality of saturable monitoring transformers, an interrogation loop connecting at least one of said monitoring transformers with the output winding of a core in the first and of a core in the second of said matrices, means for applying coincident selection currents to row and column windings of one of said matrices at a time, the other of said matrices then being nonselected, said output winding of said first matrix core being connected to apply a current pulse of one polarity through the output winding of said second matrix core to said monitoring transformers responsive to the application of said coincident currents, and a current pulse of opposite polarity responsive to the termination of said coincident currents, the bias windings of the cores of said matrices being serially connected to respective bias potentials to maintain each output winding of the nonselected one of said matrices in a low impedance condition.

4. An electronic scanning system comprising an array of scanning transformers respectively saturable in accordance with the condition of an associated telephone circuit, said scanning transformers each having an interrogate and a readout conductor linkable by a remanent switching flux path of each said transformer during only one condition of said associated telephone circuit, a readout loop serially connecting predetermined ones of said readout conductors, an interrogating loop serially connecting predetermined ones of said interrogating conductors, means for applying a bipolar current pulse to said interrogating loop to switch and reswitch the remanent switching flux paths linked by said predetermined interrogating conductors, said pulse-applying means including one energized output winding at a time of a pair of serially-connected magnetic core switching matrix windings, each magnetic core switching matrix including a respective plurality of coincident current selection windings for energizing one said output winding, normally operated means for maintaining the nonenergized one of said pair of serially-connected windings biased to exhibit a low impedance to said bipolar current pulse, a source of bias potential, and means for serially connecting the coincident current selection windings of one of said matrices to said source of bias potential.

5. An electronic scanning system according to claim 4 wherein said means for serially connecting said coincident current selection windings to said source of bias potential includes means operable upon the release of said normally operated means.

6. In a scanning circuit for an electronic telephone switching system comprising a plurality of telephone circuits whose condition is to be ascertained, a plurality of monitoring devices individually associated with said telephone circuits, said devices each providing an output indication only when the associated telephone circuit is in one condition and providing no output indication when said telephone circuit is in a second condition, means for selectively interrogating said monitoring devices including a first and second plurality of address inputs, a coincident current access switching matrix operable in respone to the receipt of an address by one of said plurality of first and by one of said plurality of second address inputs, gate means having a plurality of inputs each connected with a respective one of said monitoring devices to be energized when any of said devices is interrogated, and means responsive to the operation of at least two of said first plurality of address inputs for inhibiting said gate means.

7. An arrangement for scanning a plurality of monitored circuits comprising an array of saturable transformers each having a core, a control winding, and an interrogate and a readout conductor, said control winding of each of said transformers being connected to an individual one of said monitored circuits, said saturable transformers each having a remanent switching flux path in its core, said path being threaded by said interrogate conductor and said readout conductor, access means for applying a first pulse to said interrogate conductor to switch the remanent state of said flux path and induce a pulse in said readout conductor threading said flux path and for applying a second pulse to said interrogate conductor to restore the remanent state of said flux path, said access means including first and second magnetic core matrices, a corresponding core in each matrix having a winding connected serially with said interrogate conductor, a plurality of first and a plurailty of second address inputs, means at each of said matrices connected to said address inputs for switching one of said corresponding cores to apply said first pulse to said readout conductor in response to the receipt of an address by one of said first and by one of said second plurality of address inputs, means including a first source of bias potential for restoring said one of said corresponding cores to apply said second pulse to said interrogate conductor, means including a second source of bias potential for preventing the other of said corresponding cores from switching, an emergency source of bias potential, and means controlled by said last-mentioned means for connecting at least one of said plurailty of address inputs to said emergency source of bias potential.

8. A scanning circuit comprising a plurality of rows of monitoring devices, each monitoring device of a row being in a monitoring relationship with a respective one of a plurality of monitored circuits, a first plurality of address inputs, a second plurality of address inputs, means for interrogating any of said plurality of rows in response to the receipt of an address by one of said first and one of said second plurailty of address inputs, a plurality of readout loops connecting said monitoring devices in column, said readout loops each being selectively energized in accordance with the state of the circuit monitored by the monitoring device in each interrogated row of monitoring devices, a plurality of output circuits including one output circuit coupled to each of said readout loops for receiving therefrom according to the selective energization thereof the state of said monitored circuit, means for operating a further one of said plurality of output circuits each time all of the monitoring devices of any of said rows is interrogated, a transformer having a secondary winding individual to each of said readout loops, a third and a fourth address input, means for energizing said transformer responsive to the receipt of an address by one only of said third and fourth address inputs, and means controlled by said third and fourth address inputs for inhibiting said further output circuit operating means.

9. In a telephone switching system having a plurality of peripheral units a circuit for providing verifiable supervision of the peripheral units comprising monitoring devices for ascertaining the state of each of said units, first and second access means for interrogating said monitoring devices, a plurality of address circuits connected to said first and to said second access means, a plurality of output circuits coupled to said monitoring devices for receiving therefrom the state of the monitored units when said monitoring devices are interrogated, a further output circuit coupled to said monitoring devices for receiving therefrom an indication that said devices are being interrogated, a further address circuit, said further address circuit being coupled to said monitoring devices at each point of connection thereof to said pluarlity of output circuits, and means connected to inhibit said further output circuit responsive to said further address input.

10. In a telephone system according to claim 9, the combination where in said first and second access means include means for interrogating the same group of said monitoring devices responsive to the receipt of respective addresses from said plurality of address circuits.

11. In a scanning arrangement for an array of monitoring elements, the combination comprising a pair of serially-connected magnetic core access switch matrices each including coincident-current access circuit means addressable to select a particular core thereof, a normally-energized bias current circuit, said access circuit means and said bias circuit being operable to interrogate said monitoring elements, and an emergency bias current circuit including a portion of said coincident-current access circuit means controlled by the de-energization of said normally-energized bias current circuit.

12. In a scanning arrangement according to claim 11, the combination wherein the bias produced by said emergency circuit is of opposite polarity to the bias produced by said normally-energized bias current circuit.

13. A pair of coincident-current remanent switching magnetic core matrices for use with an array of circuit-monitoring elements, said core matrices being characterized by means for selectively coupling a respective corresponding core of each of said matrices, one at a time, to interrogate an identical group of said circuit-monitoring elements, and means for causing the noncoupled one of said corresponding cores to provide at said time a low impedance to said group of circuit-monitoring elements.

14. In a scanning arrangement having a pair of serially-connected magnetic core matrix switches for interrogating rows of ferrod monitoring devices, the combination according to which each core matrix includes a plurality of individually-addressable row select and column select windings, a normal bias loop for applying a bias to oppose the effect produced by the addressing of any of said select windings, a source of emegency bias, and a relay having a winding in said bias loop and contacts associated with said row select windings and said source of emergency bias, said relay being releasable to serially connect said row select windings with said source of emergency bias to apply an emergency bias having an effect opposite to that produced by said first-mentioned bias.

15. In an arrangement for scanning an array of monitoring elements, the combination comprising a pair of coincident current magnetic core access switch matrices having serially-connected output windings, each matrix of said pair being addressable to interrogate corresponding monitoring elements of said array, and means for maintaining the non-addressed matrix of said pair in the low impedance condition when said monitoring elements are interrogated.

References Cited by the Examiner

UNITED STATES PATENTS

| | | | |
|---|---|---|---|
| 2,902,677 | 9/1959 | Cunihan | 340—174 |
| 2,975,406 | 3/1961 | Stallard | 340—174 |
| 3,004,246 | 10/1961 | Harper | 340—166 |
| 3,126,532 | 3/1964 | Woods | 340—174 |
| 3,138,720 | 6/1964 | Glore | 179—18 X |

ROBERT H. ROSE, *Primary Examiner.*

WALTER L. LYNDE, *Examiner.*

S. H. BOYER, *Assistant Examiner.*